(12) United States Patent
Francis et al.

(10) Patent No.: US 12,244,563 B2
(45) Date of Patent: *Mar. 4, 2025

(54) SYSTEMS AND METHODS FOR WEB TRAFFIC CONTROL

(71) Applicant: SHOPIFY INC., Ottawa (CA)

(72) Inventors: Scott Francis, Washington, DC (US); Blake Delaney Manders, Grand Cayman (KY); Dennis Ho, Ottawa (CA)

(73) Assignee: SHOPIFY INC., Ottawa (CA)

( * ) Notice: Subject to any disclaimer, the term of this patent is extended or adjusted under 35 U.S.C. 154(b) by 152 days.

This patent is subject to a terminal disclaimer.

(21) Appl. No.: 17/684,993

(22) Filed: Mar. 2, 2022

(65) Prior Publication Data

US 2022/0191172 A1 Jun. 16, 2022

Related U.S. Application Data

(63) Continuation of application No. 16/782,556, filed on Feb. 5, 2020, now Pat. No. 11,297,035.

(51) Int. Cl.
*H04L 67/125* (2022.01)
*G06Q 30/0201* (2023.01)
(Continued)

(52) U.S. Cl.
CPC ..... *H04L 63/0245* (2013.01); *G06Q 30/0201* (2013.01); *G06Q 30/0641* (2013.01);
(Continued)

(58) Field of Classification Search
CPC .............. H04L 63/0245; H04L 67/535; H04L 63/0263; H04L 63/168; H04L 67/125;
(Continued)

(56) References Cited

U.S. PATENT DOCUMENTS 6,401,118 B1 6/2002 Thomas
8,078,483 B1 * 12/2011 Hirose .................. G06Q 10/02
705/5
(Continued)

FOREIGN PATENT DOCUMENTS

CN 110490752 A 11/2019

OTHER PUBLICATIONS

Keiser, Barbie E. "To Be or Not to Be: Competitive Intelligence Tools". Online Searcher 43:4: 18-25. Information Today, Inc. (Jul./Aug. 2019). 6 pages.

(Continued)

*Primary Examiner* — Shanto Abedin

(57) ABSTRACT

A system for web traffic control is provided that is based on information related to a user's previous online activity. In one embodiment, the system is able to collect information about incoming traffic, compare the information to a generated ruleset, and make and implement a decision about how to handle each request/user interaction. In one embodiment, the ruleset is based on e-commerce rules. An e-commerce rule is a unit of decision making logic based on the user's previous online activity on the e-commerce platform, e.g. "If request is to add an item to user's cart, and if user already added something to their cart less than one second ago, then block request". In some embodiments, the rules may be executed at the firewall and/or in a web application on the e-commerce platform. In some embodiments, one or more rules may be recommended to a merchant.

20 Claims, 16 Drawing Sheets

(51) Int. Cl.
*G06Q 30/0601* (2023.01)
*H04L 9/40* (2022.01)
*H04L 67/02* (2022.01)
*H04L 67/306* (2022.01)
*H04L 67/50* (2022.01)

(52) U.S. Cl.
CPC ........ *H04L 63/0263* (2013.01); *H04L 63/168* (2013.01); *H04L 67/125* (2013.01); *H04L 67/306* (2013.01); *H04L 67/535* (2022.05); *H04L 67/02* (2013.01)

(58) Field of Classification Search
CPC .............. H04L 67/306; G06Q 30/0201; G06Q 30/0641
See application file for complete search history.

(56) References Cited

U.S. PATENT DOCUMENTS

| | | | |
|---|---|---|---|
| 10,063,519 B1 | 8/2018 | Zhao et al. | |
| 11,176,230 B2* | 11/2021 | Toth | G06F 21/6218 |
| 11,201,855 B1* | 12/2021 | Kondamuri | H04L 63/0263 |
| 2005/0273855 A1 | 12/2005 | Oberle et al. | |
| 2007/0174079 A1 | 7/2007 | Kraus | |
| 2008/0115190 A1 | 5/2008 | Aaron | |
| 2008/0162298 A1* | 7/2008 | Aliabadi | G06Q 50/40 |
| | | | 705/26.5 |
| 2010/0131386 A1* | 5/2010 | Shiely | G06Q 30/02 |
| | | | 705/26.1 |
| 2010/0191692 A1* | 7/2010 | Gassewitz | H04L 67/535 |
| | | | 709/217 |
| 2010/0223471 A1* | 9/2010 | Fresko | H04L 63/12 |
| | | | 713/176 |
| 2010/0235218 A1 | 9/2010 | Erhart et al. | |
| 2013/0246146 A1 | 9/2013 | Fischer et al. | |
| 2014/0101044 A1 | 4/2014 | Blackhurst et al. | |
| 2014/0282872 A1* | 9/2014 | Hansen | H04L 63/102 |
| | | | 726/3 |
| 2014/0358629 A1 | 12/2014 | Shivaswamy et al. | |
| 2014/0372250 A1 | 12/2014 | Dugan | |
| 2015/0106876 A1 | 4/2015 | Baldonado et al. | |
| 2015/0324840 A1 | 11/2015 | Ramnath Krishnan | |
| 2015/0363858 A1 | 12/2015 | Kleinhandler et al. | |
| 2016/0210674 A1 | 7/2016 | Allen et al. | |
| 2018/0108036 A1 | 4/2018 | Laufenberg et al. | |
| 2018/0343174 A1* | 11/2018 | Battre | H04L 67/02 |
| 2019/0130439 A1 | 5/2019 | Handrigan et al. | |
| 2019/0253385 A1 | 8/2019 | Gurney | |
| 2020/0244752 A1* | 7/2020 | Trainor | H04L 51/046 |
| 2021/0241351 A1 | 8/2021 | Francis et al. | |
| 2021/0243160 A1 | 8/2021 | Francis et al. | |
| 2021/0400080 A1* | 12/2021 | Kaidi | G06N 5/025 |
| 2022/0368672 A1 | 11/2022 | Velugu et al. | |
| 2024/0015137 A1 | 1/2024 | Ho et al. | |

OTHER PUBLICATIONS

Non-Final Rejection issued on U.S. Appl. No. 16/782,561, dated Apr. 21, 2021, 23 pages.

* cited by examiner

| E-Commerce Platform | Q Search | | JG John's Apparel / Jonny B. Good |
|---|---|---|---|

⌂ Home
⇥ Orders
◇ Products
○ Customers
▥ Reports
⚙ Discounts
⊞ Apps

SALES CHANNELS  ⊕
⊟ Online Store  ◆
☐ Mobile App
View all channels

⚙ Settings

Good afternoon, Jonny B..
Here's what's happening with your store today.

Today's total sales    Today's visits
$98.00                 1

● Update your Platform Payments tax details
We require additional information to verify your identity.
[ Update tax details ]

● Advanced Cash on Delivery has been deactivated for your store
[ See why ]

All channels ⌄    Today ⌄

TOTAL SALES
$98.00

$125
$75
$25
         12am  8pm  4pm  11pm
                              Jun 1
                              2 orders

TOTAL SALES BY CHANNEL    View dashboard

Online Store                   Jun 1
$0.00                          0 orders

Mobile app
$0.00                          0 orders

Shopify POS (126 York St.)
$0.00                          0 orders

FIG. 2

Device Information — 900

| USER ID | VISIT ID | Date | Time of Request | IP Address | Browser | Device | Location | WEB REQUEST LOCATION |
|---|---|---|---|---|---|---|---|---|
| 1001 | 8001 | 2019-01-01 | 7:24:38 PM | 192.168.1.1 | Chrome | Samsung Galaxy S5 | Toronto | Homepage |
| 1001 | 8002 | 2019-01-02 | 10:23:37 PM | 192.168.1.1 | Chrome | Samsung Galaxy S5 | Toronto | All Product Page |
| 1001 | 8003 | 2019-01-03 | 3:37:10 PM | 192.168.1.1 | Chrome | Samsung Galaxy S5 | Toronto | Product ID 356 Page |
| 1001 | 8004 | 2019-01-04 | 1:54:33 AM | 192.168.1.2 | Firefox | Iphone | Moscow | Product ID 356 + Size 10 |

Purchase Information — 1000

| USER ID | VISIT ID | Email Address | Shipping Info | Billing Address | Payment Info | Number of Items | Total |
|---|---|---|---|---|---|---|---|
| 1001 | 8001 | me@host.ca | 123 Main Street | 22 First Ave | Credit Card ***234 | 2 | 45.00CAD |
| 1001 | 8002 | me@host.ca | 123 Main Street | 22 First Ave | Credit Card ***234 | 1 | 11.00CAD |
| 1001 | 8003 | me@host.ca | 123 Main Street | 22 First Ave | Credit Card ***234 | 4 | 65.75CAD |
| 1001 | 8004 | me@host.ca | 123 Main Street | 22 First Ave | Credit Card ***234 | 2 | 50.00CAD |

| USER ID | VISIT ID | Products Visited | Activity Information ||||
|---|---|---|---|---|---|---|
| | | | Items in Cart | Campaign Source? | Time On Site | Path |
| 1001 | 8001 | 135+167+222 | | 2 Youtube | 20s | Homepage>135>Homepage>167>222 |
| 1001 | 8002 | NULL | | 0 Youtube | 1m30s | NULL |
| 1001 | 8003 | 356+469 | | 1 Google | 60s | 356>469 |
| 1001 | 8004 | 126+685+654 | | 0 Facebook | 4m22s | 126>MENS>685>654 |

FIG. 12

| USER ID | VISIT ID | Instagram ID | Identity Information ||||
|---|---|---|---|---|---|---|
| | | | Instagram Followers? | Follows Merchant ID 809? | Facebook Friends | Financial Institution | ISP |
| 1001 | 8001 | mykewlpikz | 261 | Y | 1057 | Bank ABC | TelaNet |
| 1001 | 8002 | mykewlpikz | 622 | Y | 1055 | Bank ABC | TelaNet |
| 1001 | 8003 | mykewlpikz | 625 | Y | 1057 | Bank ABC | TelaNet |
| 1001 | 8004 | mykewlpikz | 700 | N | 1075 | Bank ABC | Connektor |

Firewall Embodiment

1300

RULES FOR MERCHANT ID 3568

| Rule ID | TITLE | CONDITION | OUTCOME | APPLICATION |
|---|---|---|---|---|
| 8001 | Location Speed Controller | IF(LOCATION==TORONTO) | ALLOW | ALL |
| 8003 | Social Media Follow Check | IF(FollowOnInstagram==TRUE) | ALLOW | ALL |
| 8004 | Add to Cart Frequency Check | IF(CartTime<(LastCartTime+10ms)) | BLOCK PURCHASE | PRODUCT CATEGORY = MENS |
| 8005 | Return Customer Priority | IF(RETURNCUSTOMER==TRUE) | PRIORITIZE TO FASTEST SERVER | ALL |
| 8006 | Link Origin Detection | IF(SOURCE=YOUTUBE) | PRIORITIZE TO FASTEST SERVER | ALL |

Webapp Embodiment

1400

RULES FOR MERCHANT ID 1269

| Rule ID | TITLE | CONDITION | OUTCOME | APPLICATION |
|---|---|---|---|---|
| 3001 | Cross Promo Merchant 110 | IF(CustomerOf(MERCHANT_110)) | DISPLAY PRODUCT ID 3034 | PRODUCT ID 3034 |
| 3002 | Return Customer Priority | IF(RETURNCUSTOMER==TRUE) | PRIORITIZE TO FASTEST SERVER | ALL |
| 3003 | Social Media Follow Check | IF(FollowOnInstagram==TRUE) | PRIORITIZE TO FASTEST SERVER | ALL |
| 3004 | Small Spender Delay | IF(Total_Spend<100 CAD) | ADD 5ms DELAY | PRODUCT CATEGORY = MENS |
| 3005 | Link Origin Detection | IF(SOURCE=YOUTUBE) | PRIORITIZE TO FASTEST SERVER | ALL |
| 3006 | Parent Display | IF(PreviouslyBought("Kids")) | DISPLAY PRODUCT CATEGORY "KIDS" AT POSITION 1 | ALL |

SYSTEMS AND METHODS FOR WEB TRAFFIC CONTROL

CROSS-REFERENCE TO RELATED APPLICATIONS

This application is a continuation of U.S. patent application Ser. No. 16/782,556, entitled "Systems and Methods for Web Traffic Control", which was filed on Feb. 5, 2020, the contents of which are incorporated herein by reference in their entirety.

FIELD

The following relates to systems and methods for web traffic control based on rules relating to a user's previous online activity, and recommending such rules to merchants.

BACKGROUND

A web-based service has a desire to control and take actions based on characteristics of incoming traffic. For example, an e-commerce platform may want to block access to malicious traffic, as well as be able to make decisions about how incoming traffic should be handled in order to ensure the integrity of their system and provide the best user experience to their customers.

Traditionally, incoming web traffic may be controlled and mitigated by a firewall. Some firewalls may access Open Systems Interconnection (OSI) layer 7 (application level) and/or layer 3 (network layer) information to determine if web traffic is potentially threatening. Some firewalls may compare the OSI data with a set of rules to make a decision about whether or not the traffic should be allowed to access the hosting server. However, while firewalls may have access to certain OSI information, they do not have access to additional information about a specific user trying to access the web resource. Further, firewalls are only able to decide if a web request should be allowed or blocked from accessing a server.

SUMMARY

There is a desire to store additional information about users to try to provide better decision making for access to a web-based service. This information may be used to control incoming traffic and to control the interaction of a user with a website.

In one embodiment, a system and method of web traffic control is provided that is based on supplemental user information related to a user's previous online activity. The system is able to collect information about incoming traffic, compare the information to a generated ruleset, and make and implement a decision about how to handle each request/user interaction. In one embodiment, the ruleset is based on e-commerce rules. An e-commerce rule is a unit of decision making logic based on the user's previous online commerce activity, typically in the form of an if-then statement, e.g. "If web request is to add an item to user's cart, and if user already added something to their cart less than one second ago, then block request", or "If user is registered on e-commerce platform, then prioritize user" (e.g. route user's request to a faster application server), etc.

In some embodiments, the rules may be executed at the firewall and/or in the web application. In some embodiments, one or more rules may be recommended to a merchant.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 9 is an example database of user device information, according to one embodiment;

FIG. 10 is an example database of user purchase information, according to one embodiment;

FIG. 11 is an example database of user activity information, according to one embodiment;

FIG. 12 is an example database of user identity information, according to one embodiment;

FIG. 13 is an example database of rules used to determine how a web request should be processed at a firewall, according to one embodiment;

FIG. 14 is an example database of rules used to determine how a web request should be processed in a web application, according to one embodiment;

DETAILED DESCRIPTION

For illustrative purposes, specific example embodiments will now be explained in greater detail below in conjunction with the figures.

Example Commerce Platform

In some embodiments, the methods disclosed herein may be performed on or in association with a commerce platform, which will be referred to herein as an e-commerce platform. Therefore, an example of an e-commerce platform will be described.

Figure 1:
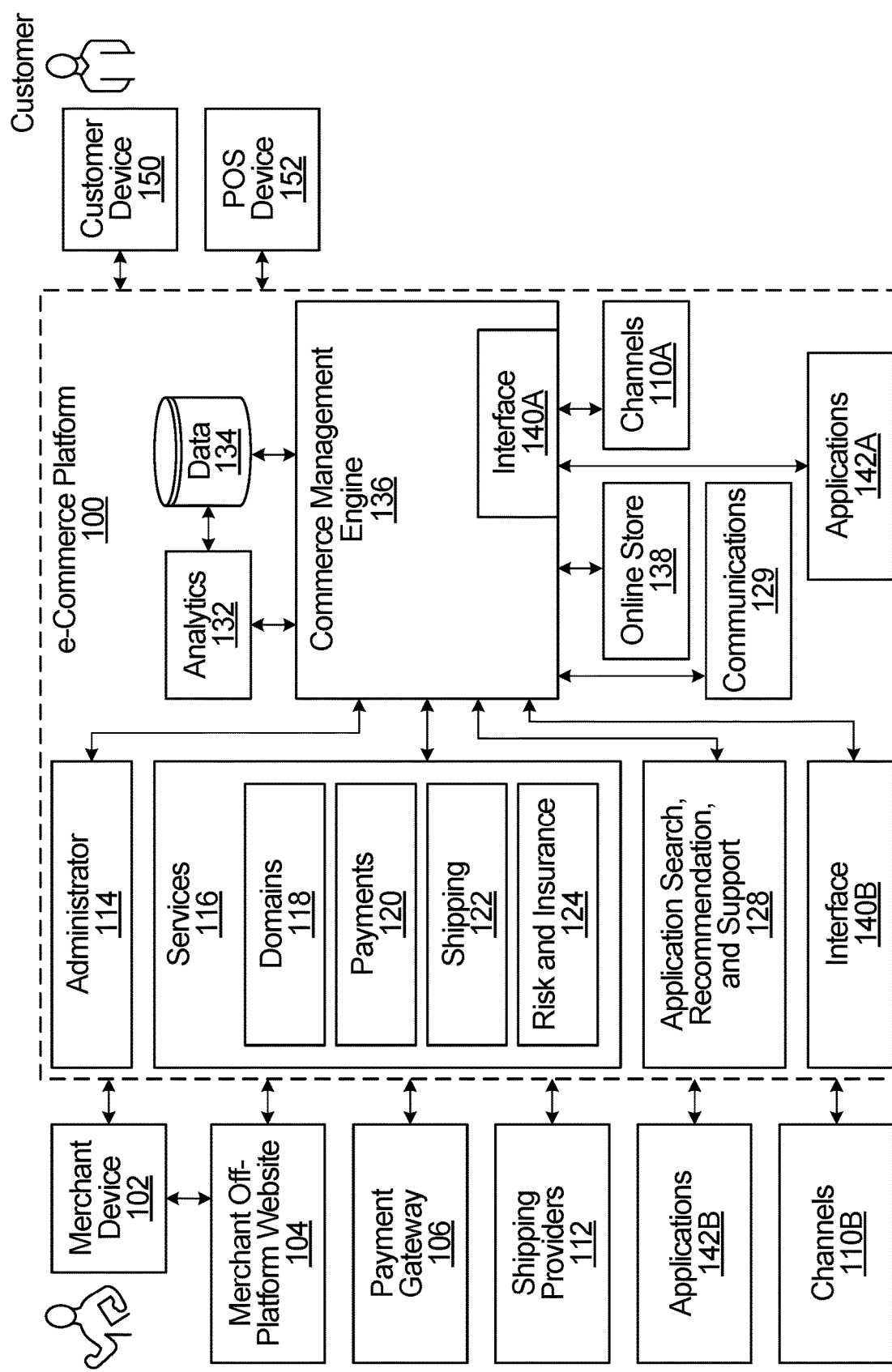
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

System for Processing Web Requests Sent to an E-Commerce Platform

Web requests (e.g. HTTP requests) may be sent to an e-commerce platform, e.g. to e-commerce platform 100 described above. It is desired to provide web-traffic control, e.g. by processing the incoming web requests sent to the e-commerce platform based on rules. For example, a web request may be identified as being associated with a particular user, and the processing of the web request may be based on that user's previous online activity. The user's previous online activity may be previous online commerce activity, which is online activity that has some relation to commerce (e.g. the user viewing a product page for a product, buying a product, adding a product to a cart, viewing a merchant home page, following a merchant on social media, etc.). A rule may be executed that causes an action to be performed based on the user's previous online commerce activity, e.g. "If user already added something to their cart less than one second ago, then block request" or "If user previously bought product A, then return version of collections webpage showing product B". In some embodiments, the rules may be executed at the firewall and/or in the web application on the e-commerce platform. In some embodiments, one or more rules may be recommended to a merchant.

Although the e-commerce platform described below may be e-commerce platform 100 of FIG. 1, in general this need not be the case. Therefore, in the system described below the e-commerce platform will be described more generally. Also, more generally, embodiments do not need to be implemented on or involve an e-commerce platform. For example, the tracking of a user's previous online activity and executing rules based on the user's previous online activity may be performed in relation to an individual merchant's website that is not implemented on an e-commerce platform.

Figure 3:
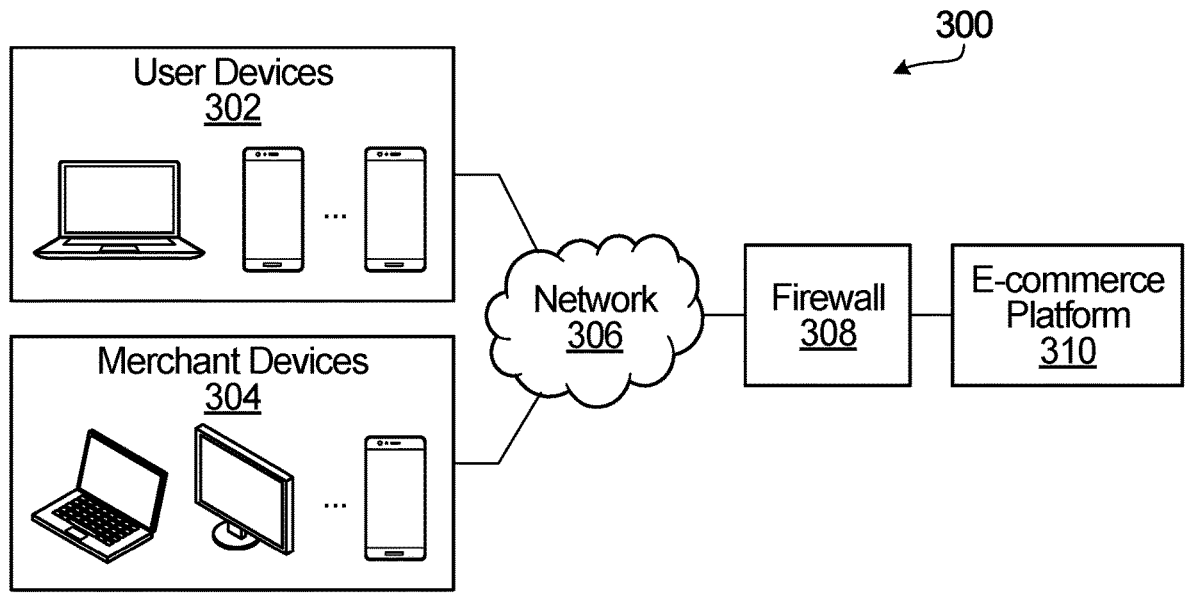
FIG. 3 is a system for controlling web requests sent to an e-commerce platform, according to one embodiment.

FIG. 3 is a system 300 for user devices 302 and merchant devices 304 to connect with an e-commerce platform 310 over a network 306, according to one embodiment. A merchant device is a device associated with a merchant account on the e-commerce platform 310. A user device is a device associated with a user that is not a merchant, e.g. a customer or potential customer visiting an online store on the e-commerce platform 310. It is possible for a same device to sometimes act as a merchant device and other times act as a user device, depending upon the situation, e.g. if the merchant uses a same device to both configure their merchant settings and browse the online stores of other merchants on the e-commerce platform 310.

The system 300 includes a firewall 308 to channel web traffic. According to some embodiments, the firewall 308 is a standalone device used to accept or reject incoming web requests from user devices 302 or merchant devices 304. According to other embodiments, the firewall 308 is a Web Application Firewall (WAF) hosted and run on a server. The firewall 308 is communicably linked with the e-commerce platform 310. The link between firewall 308 and e-commerce platform 310 may be over a local area connection or a wireless connection. The firewall 308 may request information stored in a memory on the e-commerce platform 310, or information that is housed on another server accessible by the network 306.

The user devices 302 and merchant devices 304 could be, for example, mobile phones, tablets, laptops, personal computers, etc. The e-commerce platform 310 may be the same as that described with reference to FIG. 1, although in general this need not be the case.

According to one embodiment, the network 306 may be implemented as a cellular network, a WiFi network or other wireless or wired local area network (LAN), a WiMAX network or other wireless or wired wide area network (WAN), etc. The network 306 may also communicate with other servers in the network 306, for example servers related to a social media platform.

In operation, each web request sent from a user device indicates a resource (e.g. a location or function/operation) within a host server that the user device wishes to access. For example, a web request may be a request to view a home page of a particular merchant's online store. As another example, a web request may be a request to add a certain product in a particular merchant's online store to the user's cart or complete a transaction. A web request is processed based on the user's previous online activity. Previous online activity may include tracked information, such as the way in which a user has navigated through a website (e.g. starting on a home page, proceeding to a category page, selecting a specific item), a user's purchase history, and other data such as an associated user's social media profile. The user's previous online activity that is tracked may be or include previous online commerce activity, although this need not be the case (e.g. the user's online activity tracked may have no relation to commerce). In some embodiments, the web request may also or instead be processed based on a characteristic of a user's device (e.g. a location of user's device).

According to some embodiments, the firewall 308 receives the web request from a user device, and determines based on user information how to process the web request. For example, the firewall 308 may change the priority of the web request, introduce a delay before responding to the web request, or block the web request altogether. In some embodiments, the e-commerce platform 310 is also (or instead) able to modify its operation based on a web request from a user device. For example, the e-commerce platform 310 may change the priority of the web request, introduce a delay before responding to the web request, block the web request altogether, hide or reveal specific products to the user, and/or block or reveal certain functions (e.g. block the ability to add a particular product to a cart).

Figure 4:
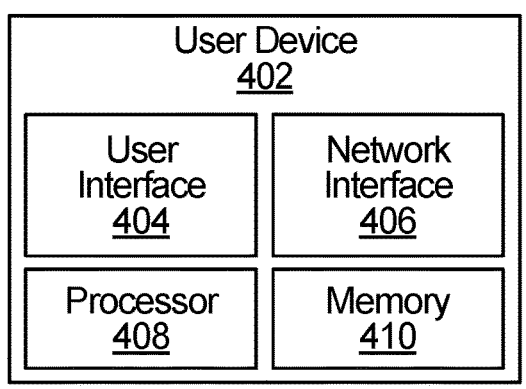
FIG. 4 is a diagram showing a user device, according to one embodiment.

FIG. 4 is a block diagram of a user device 402, according to one embodiment. The user device 402 is an example of one of user devices 302 of FIG. 3. User device 402 includes a user interface 404, a network interface 406, a processor 408, and a memory 410. The user interface 404 may be implemented as a display screen (which may be a touch screen), and/or a keyboard, and/or a mouse, etc. The network interface 406 of the user device 402 is for communicating with a web resource over network 306. The structure of the network interface will depend on how the user device 402 interfaces with the network 306. For example, if the user device 402 is a mobile phone or tablet, the network interface may comprise a transmitter/receiver with an antenna to send and receive wireless transmissions to/from the network. If the user device 402 is a personal computer connected to the network with a network cable, the network interface may comprise a network interface card (NIC), and/or a computer port (e.g. a physical outlet to which a plug or cable connects), and/or a network socket, etc. The processor 408 is implemented as one or more processors configured to execute instructions stored in a memory (e.g. in memory 410). Alternatively, some or all of the processor 408 may be implemented using dedicated circuitry, such as a programmed field-programmable gate array (FPGA), a graphical processing unit (GPU), or an application-specific integrated circuit (ASIC). The processor 408 directly performs or instructs the user device 402 to perform the functions of the user device 402 explained herein.

A user interacts with the user device 402 to access the e-commerce platform 310 over the network 306. According to some embodiments, a user may interact with a browser on the user device 402 to navigate to a merchant store within an e-commerce platform 310. According to other embodiments, the user device 402 may have a native or installed application ("App") that facilitates access to the e-commerce platform 310. User device 402 may make a web request to access a specific resource on the e-commerce platform 310, such as a merchant's online store home page. Based on the web request, the e-commerce platform 310 will deliver, to the user device 402, data required to render and interact with a merchant online store on the e-commerce platform 310. The user may then use user device 402 to navigate through the available products, select a product, and complete a purchase.

Figure 5:
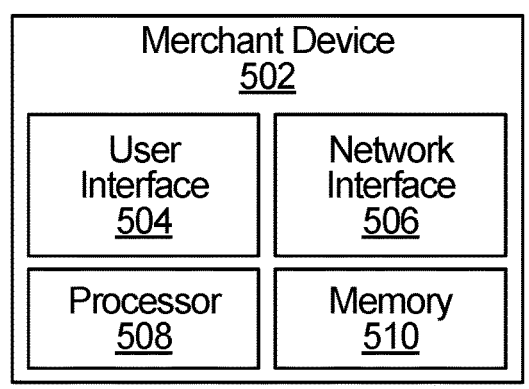
FIG. 5 is a diagram showing a merchant device, according to one embodiment.

FIG. 5 is a block diagram of a merchant device 502, according to one embodiment. The merchant device 502 is an example of one of merchant devices 304 of FIG. 3. Merchant device 502 includes a user interface 504, a network interface 506, a processor 508, and a memory 510. The user interface 504 may be implemented as a display screen (which may be a touch screen), and/or a keyboard, and/or a mouse, etc. The network interface 506 of the merchant device 502 is for communicating with a web resource over network 306. The structure of the network interface will depend on how the merchant device 502 interfaces with the network 306. For example, if the merchant device 502 is a mobile phone or tablet, the network interface may comprise a transmitter/receiver with an antenna to send and receive wireless transmissions to/from the network. If the merchant device 502 is a personal computer connected to the network with a network cable, the network interface may comprise a network interface card (NIC), and/or a computer port (e.g. a physical outlet to which a plug or cable connects), and/or a network socket, etc. The processor 508 is implemented as one or more processors configured to execute instructions stored in a memory (e.g. in memory 510). Alternatively, some or all of the processor 508 may be implemented using dedicated circuitry, such as an FPGA, GPU, or an ASIC. The processor 508 directly performs or instructs the user device 502 to perform the functions of the merchant device 502 explained herein.

A merchant may manage their stores via a merchant account within the e-commerce platform 310 over the network 306 through their merchant device 502. A merchant may manage settings within their store in the e-commerce platform 310, products available, and any services within the platform they employ. According to some embodiments, a merchant may interact with a browser on the merchant device 502 to navigate to a merchant store dashboard. According to other embodiments, the merchant device 502 may have a native or installed application ("App") that facilitates access to the e-commerce platform 310. Merchant device 502 may make web requests to access specific resources on e-commerce platform 310, such as a merchant's dashboard page associated with the merchant's account. The merchant may then use merchant device 502 to manage their available products and services within e-commerce platform 310.

Figure 6:
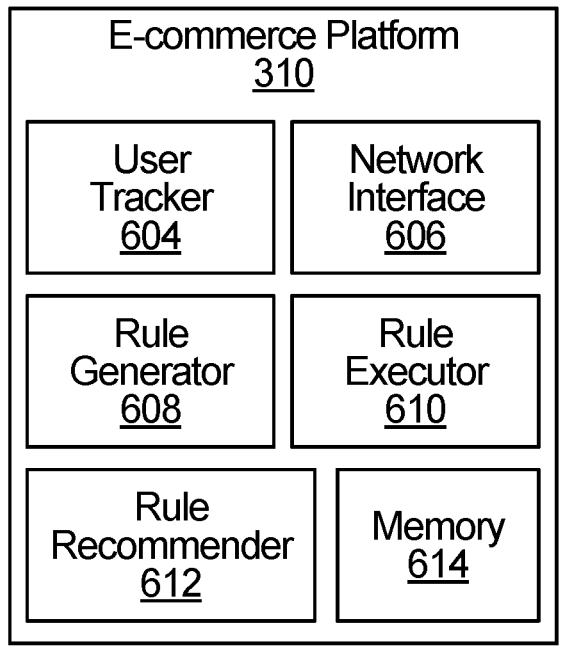
FIG. 6 is a diagram showing an e-commerce platform, according to one embodiment.

FIG. 6 is a block diagram illustrating e-commerce platform 310 in more detail, according to one embodiment. E-commerce platform 310 contains a user tracker 604, network interface 606, rule generator 608, rule executor 610, rule recommender 612, and memory 614.

The structure of the network interface 606 will depend on how the e-commerce platform 310 interfaces with the network. For example, if the e-commerce platform 310 is hosted on a server in a data center, where the server is connected to the network with a network cable, the network interface may comprise a network interface card (NIC), and/or a computer port (e.g. a physical outlet to which a plug or cable connects), and/or a network socket, etc.

Each one of the user tracker 604, rule generator 608, rule executor 610, and rule recommender 612 may be implemented by one or more processors that execute instructions stored in memory, e.g. in memory 614. The instructions, when executed by the one or more processors, cause the one or more processors to perform the operations of the user tracker 604, rule generator 608, rule executor 610, and rule recommender 612. Alternatively, some or all of the user tracker 604, rule generator 608, rule executor 610, and/or rule recommender 612 may be implemented using dedicated circuitry, such as via an ASIC, a GPU, or an FPGA that performs the operations of the user tracker 604, rule generator 608, rule executor 610, and/or rule recommender 612.

FIG. 6 is a logical representation. The components of FIG. 6 may be distributed in some embodiments. For example, in some embodiments, the memory 614 does not reside on the same physical host as other components of the e-commerce platform 310.

In operation, web traffic, such as HyperText Transfer Protocol (HTTP) requests, are received through the network interface 606. Network interface 606 may receive incoming web traffic from a firewall (e.g. firewall 308). A web request has a structure such that it is a request to access a particular resource on the e-commerce platform 310, for example a home page, a category or product page, or a progression through a purchase procedure.

Each web request in the web traffic is associated with a particular user. User tracker 604 extracts the information about the user from each web request and stores the information in a database in the memory 614. Information about the user's device, identity, and online activity is tracked by user tracker 604, as discussed below. User tracker 604 may continually update the memory 614 with any new information about activity within the e-commerce platform 310.

System rules may be generated by rule generator 608. A rule is defined as a unit of decision making logic, where a single rule can comprise multiple criteria. These rules generally follow an "if [condition] then [outcome]" structure, e.g. "if user already purchased product A, then allow user's request to add product B to an online cart".

In order to make a determination about how to handle the incoming web traffic, the rule executor 610 will compare the information stored about the previous user interactions, and the current user interaction, with a set of rules. The rule executor 610 will process the web traffic based on the rules. For example, if the rule is "if the user has already purchased product A, then show them product B on product collection page", and if a web request from a user is received requesting the product collection page, then the rule executor 610 will check memory to determine whether the user has already purchased product A, and if so instruct a collections page to be returned that includes product B. A rule may be specific to a merchant, e.g. merchant A may implement the rule "if user has previously visited merchant A's homepage, then make additional inventory of merchant A's product D available for sale to user", whereas another merchant B may not implement that rule.

The rule recommender 612 recommends rules to merchants, e.g. in the manner explained below.

Figure 7:
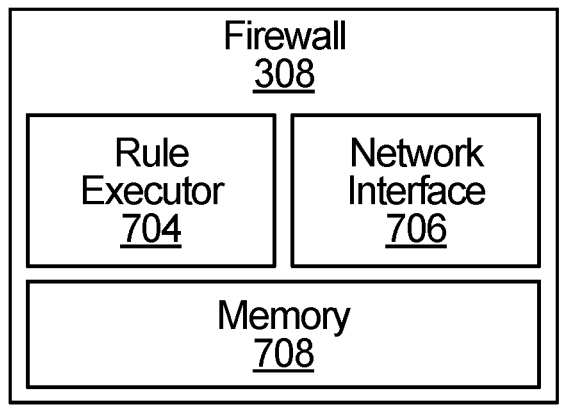
FIG. 7 is a diagram showing a firewall, according to one embodiment.

FIG. 7 is a block diagram illustrating firewall 308 in more detail, according to one embodiment. The firewall 308 includes a rule executor 704, a network interface 706, and a memory 708. The firewall 308 may be implemented using standalone hardware (i.e. a firewall device) within a web hosting network, and may also (or instead) be implemented as a web application firewall. The firewall 702 is communicably linked to a general network (such as the network 306 of FIG. 3) and an e-commerce platform (such as the e-commerce platform 310 of FIG. 3).

The structure of the network interface 706 will depend on how the firewall 308 interfaces with the network. For example, if the firewall 308 is hosted on a server connected to the network with a network cable, the network interface may comprise a network interface card (NIC), and/or a computer port (e.g. a physical outlet to which a plug or cable connects), and/or a network socket, etc.

The rule executor 710 may be implemented by one or more processors that execute instructions stored in memory, e.g. in memory 708. The instructions, when executed by the one or more processors, cause the one or more processors to perform the operations of the rule executor 710. Alternatively, rule executor 710 may be implemented using dedicated circuitry, such as via an ASIC, a GPU, or an FPGA that performs the operations of the rule executor 710.

FIG. 7 is a logical representation. The components of FIG. 7 may be distributed in some embodiments. For example, in some embodiments, the memory 708 does not reside on the same physical host as other components of the firewall 308.

In operation, web traffic is received through the network interface 706, and the rule executor 704 implements rules to process the web requests. The rules may be stored in memory 708. In some embodiments, one or more of the rules may be received from the e-commerce platform 310. Each rule generally follows an "if [condition] then [outcome]" structure, e.g. "if user already added an item to their online cart less than 5 seconds ago, then block a request to add another product to the user's online cart".

The rule executor 704 identifies a user associated with each web request. Once the user is identified, the rule executor 704 can then query a database in a memory, or send a request to e-commerce platform 310, to obtain information about the user's previous online activity. The information derived from the incoming web request and the user's previous online activity information is then used by the rule executor 704 to determine if the condition for the rule is met. If the condition is met, the rule executor 704 processes the request according to the rule. Depending upon the rule, processing the request may include actions such as prioritizing the web request by routing it to a server with greater processing power (or lower load), deprioritizing the web request by routing it to a server with less processing power (or higher load), introducing a delay before fulfilling the web request, or blocking the web request outright.

More details related to tracking the user's previous online activity, establishing rules, and recommending rules are discussed below.

Tracking Users and User Activity

As a customer interaction with e-commerce platform 310 progresses through an initial visit to a merchant website, browsing products, adding to cart, and completing a purchase within a merchant website, the e-commerce platform 310 is able to record increasing amounts of information relating to a user and their activity. Each user interaction with a merchant website may generate additional information. The user tracker 604 tracks information about the device used, information about the activity within the e-commerce platform (for example, what pages the user visited while shopping on a merchant web site), information about any transactions that take place (such as shipping addresses, billing addresses, credit cards, etc.) and information about user identity (such as a social media profile).

In some embodiments, the user tracker 604 is also able to request information about a user that is stored external to the e-commerce platform 310, such as on a social media platform. Examples of social media platforms include Facebook™, Pinterest™, and Instagram™. For example, the user tracker 604 may generate requests, for example application program interface (API) requests, to be sent to a social media platform for access to specific information stored on the memory of the social media platform. For example, the user tracker 604 may obtain the email address of the user (which may be stored in the e-commerce platform 310), and then instruct transmission of an API request to a social media platform to determine if the user email is connected to an account within the social media platform. The request may ask for information such as how many followers the user has on the platform, and if the social media account is following the merchant on the platform. The social media platform would then return, over the network, answers to the request.

User information tracked by user tracker 604 can be stored in memory (e.g. in memory 614 of e-commerce platform 310). The user tracker 604 may track, store, and categorize user information based on past actions or transactions. The user tracker 604 may associate the information with a unique identifier for the specific user. Some or all of the collected information may also be stored as a cookie on a user device (like user device 402). The user information database may be updated and refreshed over time. In some embodiments, the user information database may be replicated at the firewall 308 and stored in its memory 708. The firewall's copy of the user information database may be periodically updated asynchronously or kept up-to-date synchronously by the user tracker 604 of the e-commerce platform 310.

Figure 8:
FIG. 8 is an example database of user information stored for a plurality of users, according to one embodiment.

FIG. 8 illustrates an example database of tracked user information, which is illustrated as a table 800, and which may be stored in memory on the e-commerce platform 310. The user information has been summarized with headings812 of sample information for illustrative purposes. Table 800 includes information for three users 802 each having a unique ID. The user tracker 604 may alternatively categorize users into groups based on a particular criterion, and record information into the table based on a group ID (e.g. all users associated with a particular location form a group that is identified by a group ID and tracked). According to some embodiments, the user tracker 604 can track information related to the user device 804. The user tracker 604 may also track user purchase information 806. The user tracker 604 may also track user activity 808. The user tracker 604 may also track information about the user's identity 810. Examples of device information 804, purchase information 806, activity information 808, and identity information 810 are described in greater detail in FIGS. 9-12. While FIGS. 9-12 identify specific pieces of information gathered in the table 800, it will be recognized that any trackable information within an e-commerce platform within a computer network can be stored in the table 800 for later retrieval.

According to some embodiments, a merchant is able to configure the amount and type of information the user tracker 604 is able to track about users visiting webpages and performing operations associated with that merchant or the merchant's website. According to other embodiments, the user tracker 604 may track all information about users, and the merchants may be able to decide which information is used for a specific rule.

FIG. 9 is an example database 900 having headings 908 of device information 906 tracked for a single user 902 (user "1001") across multiple visits 904. The database 900 is stored on a memory in a server, e.g. memory 614. The database 900 has been populated with example information for illustrative purposes. Device information 906 can include information about a date and time of a web request, an IP address associated with the device, a browser used by the device, a device type, a location of the device, and the specific requested resource. Each time a user device accesses a merchant website or related function (e.g. "add to online cart") within the e-commerce platform 310, user tracker 604 records a new entry with information about the device used to access the website/function.

FIG. 10 is an example database 1000 having headings 1008 of purchase information 1006 tracked about a single user 1002 across multiple visits 1004. The database 1000 is stored on a memory in a server, e.g. memory 614. The database 1000 has been populated with example information for illustrative purposes. Purchase information can include the following information for the user 1002: email address, shipping information, billing information, payment information, number of items purchased at a time, particular items purchased (not illustrated), and total price of purchase. Each time a user makes a purchase on a merchant website within the e-commerce platform 310, user tracker 604 records a new entry with information about the purchase. Purchase timing for the user may be tracked (e.g. a date/time stamp documenting the date and time of each purchase previously made by the user, generally or specifically in relation to particular products).

FIG. 11 is an example database 1100 having headings 1108 of activity information 1106 tracked about a single user 1102 across multiple visits 1104. The database 1100 is stored on a memory in a server, e.g. memory 614. The database 1100 has been populated with example information for illustrative purposes. Activity information 1106 includes information about products visited by a user in a visit 1104, how many items they added to their cart, the campaign source that brought them to the store, the time they spent on the store or particular page, and the page navigation path (e.g. that the user started on a merchant store splash page, then proceeded to navigate to a specific section of a merchant store, then a product in the section, etc.). In contrast to purchase information shown in FIG. 10, each time a user interacts with a merchant website within the e-commerce system 310, the user tracker 604 records a new entry with information about the activity, regardless of whether or not a purchase was made.

FIG. 12 is an example database 1200 having headings 1208 of identity information 1206 tracked about a single user 1202 across multiple visits 1204. The database 1200 is stored on a memory in a server, e.g. memory 614. The database 1200 has been populated with example information for illustrative purposes. Identity information 1206 includes user IDs for a social media platform (like Instagram™), status, follower, and/or friend count on a social media platform (e.g. number of Instagram™ followers), whether or not the user 1202 follows the merchant on one or more social media platforms, and could include information like financial institution or internet service provider, etc. If the user is registered with the e-commerce platform 310 (e.g. has a customer account with the e-commerce platform 310), then at least some of the information provided as part of the user's registration may be stored in database 1200 (e.g. the user's username, age, gender, etc.).

In some embodiments, identity information may be populated by user tracker 604 querying various databases and servers across a network. For example, the user tracker 604 may retrieve the email address associated with an account (stored in purchase information) and send an API request to a server hosting a social media platform to determine if the social media account associated with the user email address follows the merchant account. User tracker 604 may resend such requests periodically (for example, once a week), or each time the user interacts with the merchant website.

In some embodiments, the user information tracked by the user tracker 604 may include source of a user visit (e.g. the user arrived at a merchant webpage from a particular one or more online advertisements).

In some embodiments, the user information tracked by the user tracker 604 may include actions performed by the user that are considered problematic or undesirable, e.g. if the user has made a fraudulent order, if the user has requested too many returns in the past (e.g. a number of returns above a certain preconfigured threshold), etc. The presence of such online commerce activity may be used to execute rules that may deny future resource requests made by the user (e.g. to block or delay certain webpages or functions, such as adding a product to a cart).

The user information tracked by user tracker 604 is used to process incoming web requests based on rules. Examples of rules and generation of rules are explained in more detail below.

Storing and Generating Rules

Rules are executed to process incoming web requests. The rules are stored in a memory, and generally each follow an "if [condition] then [outcome]" structure. Some rules may be merchant specific (e.g. only applicable when the incoming web request requests a resource associated with a particular merchant account or merchant website), whereas other rules may be independent of the merchant account associated with the web request.

The rules may be executed at the firewall 308 by rule executor 704 and/or at the web application level in the e-commerce platform 310 by rule executor 610, depending upon the embodiment.

FIG. 13 illustrates an example database 1300 of rules used in embodiments where the firewall 308 executes the rules. This database 1300 illustrates the rules for a single merchant account, i.e. the illustrated rules are specific to and only apply to one particular merchant, which is identified in FIG. 13 as merchant "3568". The database 1300 includes columns associated with a rule ID 1302, a rule title 1304, a condition 1306, an outcome 1308, and an application 1310. For example, the first row in FIG. 13 is a rule 8001 with title "Location Speed Controller". This rule allows all traffic with a "Location" value of "Toronto" to reach the requested web resource. The condition 1306 for this rule 8001 is whether or not the location of the web request originates from Toronto. The outcome 1308 when the condition 1306 is met is to allow the web request. This rule has an application 1310 to all pages and products within the merchant website.

A rule's condition 1306 is typically based on the tracked information relating to the user's previous online activity, e.g. the user's previous online commerce activity, which may be on the e-commerce platform 310. However, the rule may additionally be based on other information, e.g. OSI information. A rule typically has a single outcome out of a plurality of outcome possibilities. Example outcomes may be allowing a request, blocking a request, slowing a user request (e.g. adding a delay before processing the user request), or prioritizing or redirecting a user request for faster processing.

For a single rule ID 1302 in rule database 1300, the rule includes a title 1304 used for display in a merchant UI, a condition 1306 for when the rule should apply, an outcome 1308 for how to handle the rule 1302 if the condition 1306 is met, and an application 1310 for what parts of a merchant store the rule 1302 is to apply to. For example, for rule ID 8004 having title "Add to Cart Frequency Check", if the user has added an item to the cart within the last ten milliseconds, and tries to add an item to the cart again, the request will be blocked. This rule is only applied to products with the category "Men's".

According to some embodiments, the rules may be pre-configured by a system administrator, e.g. a system administrator of e-commerce platform 310. For example, an e-commerce systems administrator may identify information related to web traffic that is a cause for concern.

According to some embodiments, the rules may be customized to be merchant-specific and may be defined by the specific merchant on their own. This may be done by individual merchants through a merchant user interface on the merchant device 502. The rule definition interface may also present the merchants with the ability to determine how much information is collected in relation to users that request resources (e.g. web pages or operations) related to the merchant account. The merchant may define the condition or thresholds, and if the condition is met, how the user's web request is processed.

In some embodiments, one or more rules executed at the firewall 308 may pertain to blocking or delaying a request from a user in view of previous online activity of that user that causes the user to be "blacklisted". For example, a request from a user may be blocked if the user has made a fraudulent order in the past, or has requested too many returns in the past. In some embodiments, a user is added to a blacklist based on the user's previous online activity, and a list of blacklisted customers is consulted by the firewall 308 upon receipt of a user request. If the user sending the request is on the blacklist, then the request is blocked or delayed by the firewall 308. In some embodiments, the list (or updated list) of blacklisted customers may be pushed from the e-commerce platform 310 to the firewall 308, e.g. on a periodic basis. In some embodiments, a user may be blacklisted either explicitly by the merchant or implicitly by the e-commerce platform 310. In some embodiments, the rules relating to blacklisting may also (or instead) be executed at the web-app level.

FIG. 14 illustrates an example database 1400 of rules used in embodiments where the e-commerce platform 310 executes the rules at the web app level (e.g. by rule executor 610). The database 1400 illustrates rules for a single merchant account, i.e. the illustrated rules are specific to and only apply to one particular merchant, which is identified in FIG. 14 as merchant "1269". Similar to the database 1300 of FIG. 13, the database 1400 of FIG. 14 includes a rule ID 1402, a rule title 1404, a condition 1406, an outcome 1408, and an application 1410. However, the outcomes 1408 available may be more extensive compared to at the firewall level, e.g. hiding or revealing different products based on a user's previous purchase history. For example, rule 3006 titled "Parent display" includes the condition that if the user previously bought a product categorized as "kids" (e.g. kids boots), then the merchant webpage requested by the user (e.g. a requested collections page) will display kids products at the top of the requested webpage.

Executing Rules

Once the rules are established, the rules are to be executed.

According to embodiments where rules are executed by firewall 308, incoming web traffic, such as an HTTP request, is received by the network interface 706. Network interface 706 is communicably linked to rule executor 704. Based on the incoming web traffic (e.g. the HTTP request), the rule executor 704 identifies a user associated with the request. Once the user is identified, the rule executor 704 can then query a database in a memory (e.g. the database examples in FIGS. 8 to 12) to obtain information about the user's previous online activity. The query may be in the form of a request to the e-commerce platform 310, e.g. if the tracked user information is stored in the e-commerce platform 310.

Rule executor 704 can then query a memory (such as memory 708 or memory 614 in ecommerce platform) to determine what rules exist generally, and/or for the specific merchant associated with the request. The specific merchant associated with the request may be identified based on the content of the request, e.g. based on the URL in the request (e.g. a domain, subdomain, or path in the URL is associated with the merchant in memory of the firewall 308 or in memory of the e-commerce platform 310). The information derived from the incoming web request and the queried user online activity are then used by the rule executor 704 to determine if the condition for any of the applicable rules is met. If a condition for an applicable rule is met, the rule executor 704 processes the HTTP request according to the defined outcome of the rule. This may include performing operations such as: allowing the HTTP request, prioritizing the HTTP request by routing it to a server with greater processing power (or lower load), deprioritizing the HTTP request by routing it to a server with lesser processing power (or with higher load), introducing a delay before fulfilling the HTTP request, or blocking the HTTP request outright.

According to embodiments where rules are executed by the e-commerce platform 310, incoming web traffic, such as an HTTP request, is received by the network interface 606. Network interface 606 is communicably linked to rule executor 610. Based on the incoming web request, the rule executor 610 identifies a user associated with the web request. Once the user is identified, the rule executor 610 can then query a database in a memory (e.g. the database examples in FIGS. 8 to 12) to obtain information about the user's previous online activity. Rule executor 610 can then also query a memory (such as memory 614) to determine what rules exist generally, and/or for the specific merchant associated with the web request. The specific merchant associated with the web request may be identified based on the content of the web request, e.g. based on the URL in the web request (e.g. a domain, subdomain, or path in the URL is associated with the merchant in memory of the e-commerce platform 310). The information derived from the incoming web request and the queried user online activity are then used by the rule executor 610 to determine if the condition for any of the applicable rules is met. If a condition for an applicable rule is met, the rule executor 610 processes the request according to the defined outcome of the rule. This may include performing operations such as: hiding/revealing certain products or functions, blocking the request, prioritizing or deprioritizing the request, etc.

Recommending Rules to a Merchant

Rules may also be recommended to a merchant by a rule recommender 612 within the e-commerce platform 310. Recommended rules may be determined by an algorithm executed by the rule recommender 612.

In one embodiment, the algorithm executed by the rule recommender 612: (1) tracks information (e.g. statistics) related to a particular rule that has been implemented for a first merchant account for a first product or function; (2) determines from the information that a desired outcome has been achieved for the first merchant account in relation to the particular rule; (3) identifies a second merchant account that may benefit from the particular rule; and (4) recommends the particular rule for the second merchant account, possibly for a product associated with the second merchant account (e.g. for a product sold by a merchant associated with the second merchant account). For example, the particular rule implemented for the first merchant account may be: "If user previously purchased a kids jacket from first merchant, and if user is requesting the shoes collection webpage page from the first merchant, then position kids shoes at top of returned webpage". The rule recommender 612 may determine that sales of kids shoes increased by 350% after the rule was implemented for the first merchant account compared to before the rule was implemented. The rule recommender 612 may then identify a second merchant account that also sells kids outerwear and recommend the rule for the second merchant account.

In some embodiments, the particular rule implemented for the first merchant account may specifically control a user's online access to a particular product or function (e.g. "If the user previously purchased product A from the merchant, then allow the user to view the product page for product B sold by the merchant"). However, more generally the rule may not necessarily relate to a user's previous online activity. For example, the rule may be based on a user's location. In one specific example, the rule may be to block traffic originating from a server that has been identified to be a source of malicious web traffic, e.g. blocking traffic originating from a user device indicative of use by hackers or distributed denial of service (DDoS) attacks. Examples of ways in which rules can control a user's online access to a particular product include: presenting or withholding additional inventory of the particular product, allowing or not allowing the particular product to be added to an online cart (and/or purchased), surfacing the particular product on a merchant webpage in a particular way (e.g. placing the particular product as the first item on a collection page), and/or adding a delay to the user's request to view or purchase the particular product in relation to competing requests from other users.

In some embodiments, the rule recommender 612 may analyse the outcome or impact of a rule implemented for a first merchant account for a particular product. This may be done by the rule recommender 612 tracking information (e.g. statistics) related to the particular product (e.g. related to sales or online views of the particular product) once the rule is implemented. For example, the rule recommender 612 may access some or all of the completed purchases of the particular product within e-commerce platform 310, which may allow the rule recommender 612 to compare sale of the particular product after the rule is implemented compared to before the rule is implemented.

Assuming the rule has been successful for the merchant associated with the first merchant account, the rule recommender 612 may identify a similar merchant and recommend that rule to the similar merchant. The similarity between merchants may be based on the products offered, demographics, or similar patterns of use by customers. For example, if a certain rule caused sales to increase in one merchant store, the rule recommender 612 could suggest the use of that rule to another similar merchant. Alternatively, if use of a certain rule helped control or add preferences for high-traffic events (such as flash sales or highly anticipated product releases), the same rule could be suggested to another merchant to help allow successful product purchases for that other merchant's preferential users.

In some embodiments, a first merchant may be considered similar to a second merchant if the rule that was successful for the first merchant relates to a first product, and the second merchant sells a second product that has a same characteristic as the first product. Two products having a "same characteristic" may be two products of the same product type/category, and/or two products having a same designation in the e-commerce platform (e.g. discount applied, and/or quantity below a certain threshold, and/or product in inventory for more than X number of days, and/or time-limited availability for sale, and/or product associated with a flash sale, etc.). For example, the rule for the first merchant may be "if user previously bought dog sweater A from the first merchant, and if web request from user is for the home page of the first merchant, then feature dog hat B on the version of the home page returned to the user". The result of the rule is an increase in product views for the product page of dog hat B. The rule recommender 612 queries memory to determine that a second merchant sells dog hat C. Dog hat C has the same characteristic as dog hat B because they are of the same product type (dog hats). The rule is then recommended to the second merchant for dog hat C.

Identifying the second merchant may be implemented by simply looking up in memory the merchant that is selling an identified product (e.g. the merchant selling dog hat C in the example above). In some embodiments, a further criterion relating to the second merchant may need to be satisfied before the recommendation is made, e.g. the recommendation is only made if the second merchant is of a certain size, or is located in a same country, city, or region as the first merchant, etc.

In some embodiments, the recommendation algorithm executed by the rule recommender 612 may have access to information in memory 614 about specific merchants, their products viewed and purchase history of their products, and information about their current and target customer base. The recommendation algorithm may also have access to all user information across the e-commerce platform 310. In some embodiments, the rule recommender 612 may also use industry trend prediction data to assist with generating recommendations (e.g. API requests to a social media platform return results indicating that dog hats are growing in popularity, which may weigh into whether a rule relating to dog hats is recommended to merchants that sell dog hats).

Rule recommender 612 may present the rule recommendations on a user interface accessible by a merchant using a merchant device 502. For example, the rule recommender 612 may generate a graphical user interface (GUI) within a standalone app, or web page to display rules that the rule recommender 612 has determined to be of interest to the specific merchant. Using this interface, a merchant can use their merchant device 502 to decide if they would like the specific recommended rule from rule recommender 612 to be implemented within their online store. Example user interfaces are described below (e.g. in relation to FIG. 17). Also, an example method for recommending a rule is further described below in relation to FIG. 22.

Example Merchant Interface Controls

Figure 15:
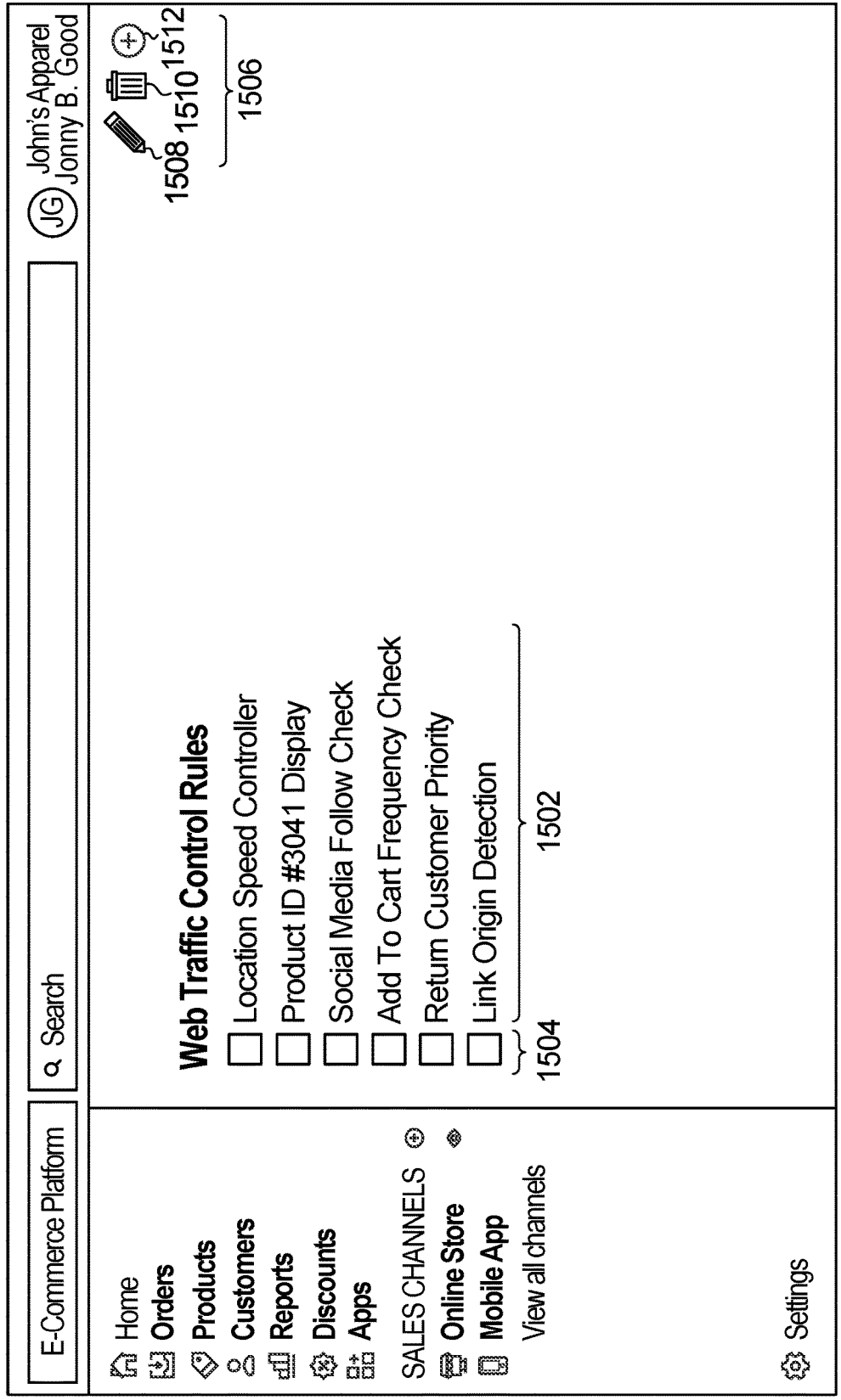
FIGS. 15 and 16 are each an example user interface of a merchant device for managing rules to determine how a web request should be processed, according to one embodiment.

FIG. 15 is an example interface 1500 for a merchant to manage web traffic control rules in e-commerce platform 310, according to one embodiment. The interface 1500 shows rules 1502, and command buttons 1506. Command buttons 1506 include edit 1508, delete 1510, and new rule 1512. Using the checkbox 1504 next to each rule 1502, the merchant may edit 1508 or delete 1510 an individual rule 1502.

Editing a rule will allow a merchant to modify the condition, outcome, and/or application of an individual rule. Deleting a rule will allow a merchant to stop enforcing the rule. Adding a new rule will instruct the rule generator 608 to create a new rule for web traffic control.

Figure 16:
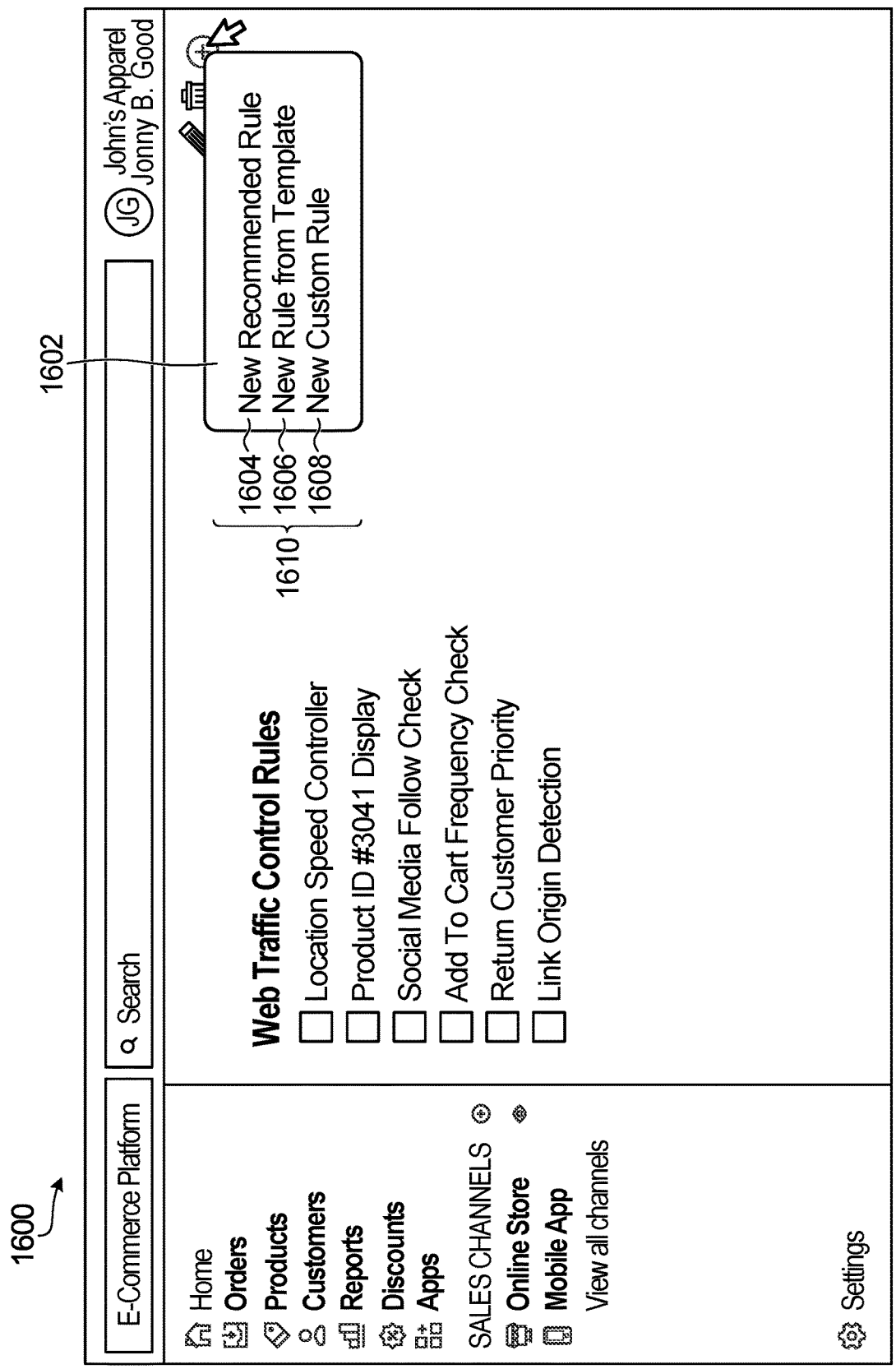

FIG. 16 is an example interface 1600 for a merchant interacting with the new rule 1512 command. When a merchant clicks on new rule 1512, a window 1602 may appear within the interface 1600, offering different options for how to generate the new rule. As illustrated, the new rule may be a new recommended rule 1604, a new rule from a template 1606, or a new custom rule 1608, based on a custom entry field. The window 1602 presents new rule command options 1610 for a merchant to add the new recommended rule 1604, new rule from template 1606, or new custom rule 1608.

Figure 17:
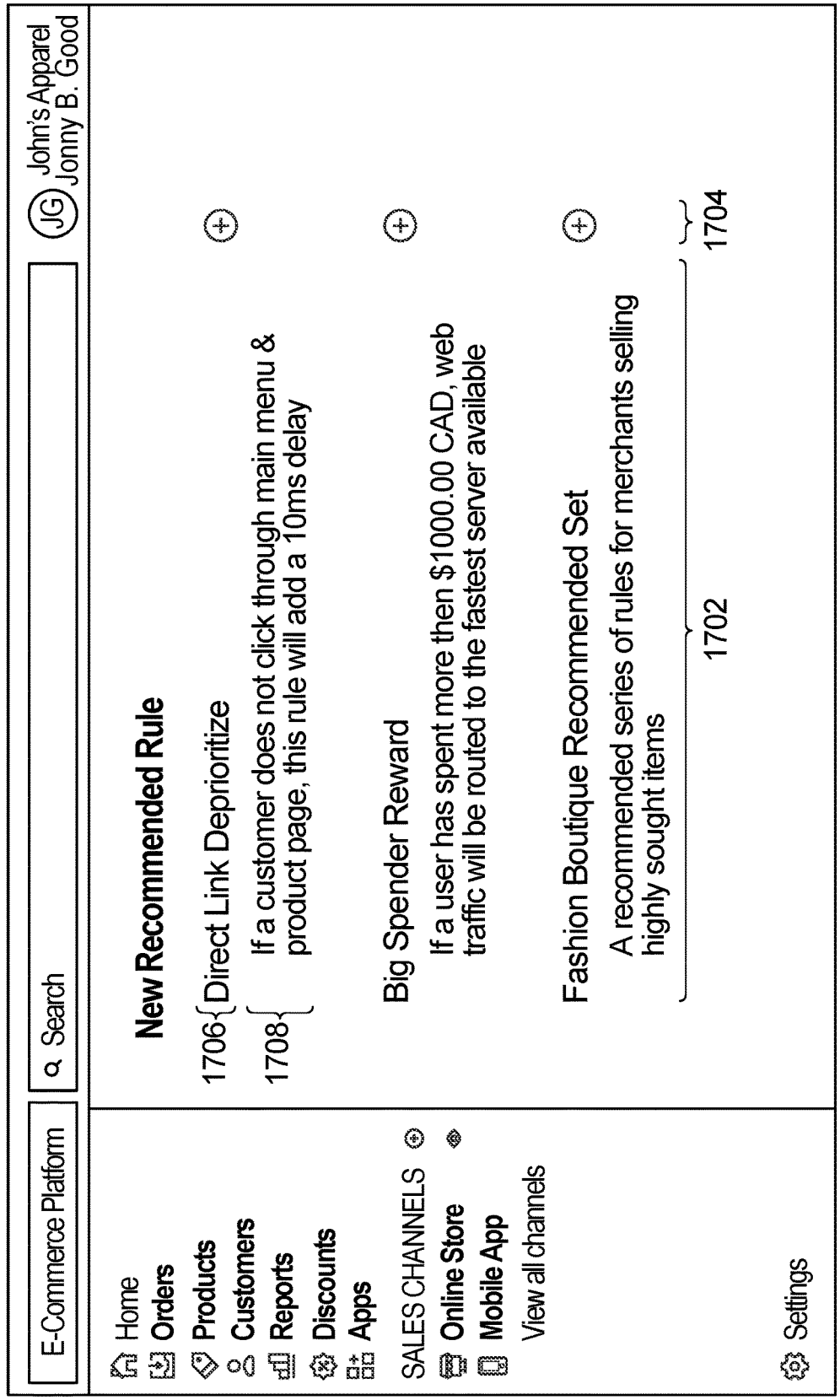
FIGS. 17 to 19 are each an example user interface of a merchant device for adding rules to determine how a web request should be processed, according to another embodiment.

FIG. 17 is an example interface 1700 for adding a new rule using a recommended rule. The interface 1700 provides the merchant with recommended rules 1702, each having a title 1706 and description 1708. The interface 1700 also has an add rule command 1704. In operation, when a merchant clicks on the add rule command 1704, the rule 1702 will be added to the specific merchant's e-commerce store. That is, the rule generator 608 is instructed to store a rule in a memory to be applied to web traffic directed to the web resources associated with the specific merchant account.

Figure 18:
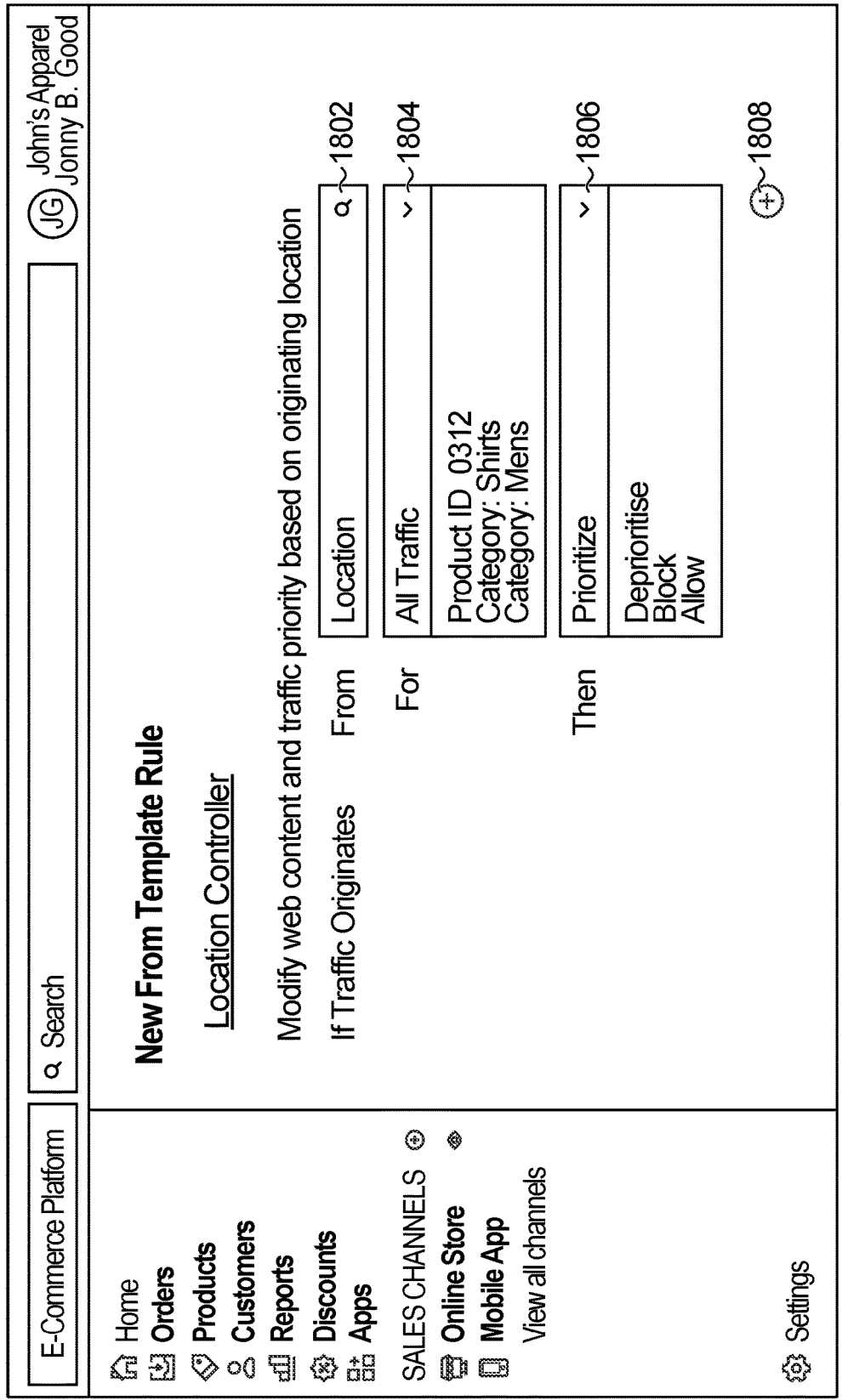

FIG. 18 is an example interface 1800 for adding a new rule using a template rule from a library of template rules. The interface 1800 provides the merchant with fields specific to the template selected by the merchant. In the interface 1800, the illustrated template is called "Location Controller", and allows the merchant to modify web content and traffic priority based on the originating location of a web request. The merchant may select a location using location field 1802, an application field 1804 to determine what the rule should apply to (e.g. all traffic, particular categories of products, etc.), and the outcome 1806 for how the rule executor (either rule executor 610 or 704) should manage traffic that meets the location 1802 and application range 1804. Once the merchant selects each one of the three fields, the merchant can use the add rule button 1808 to add the rule, which instructs rule generator 608 to store a rule in a memory to be applied to web traffic.

Figure 19:
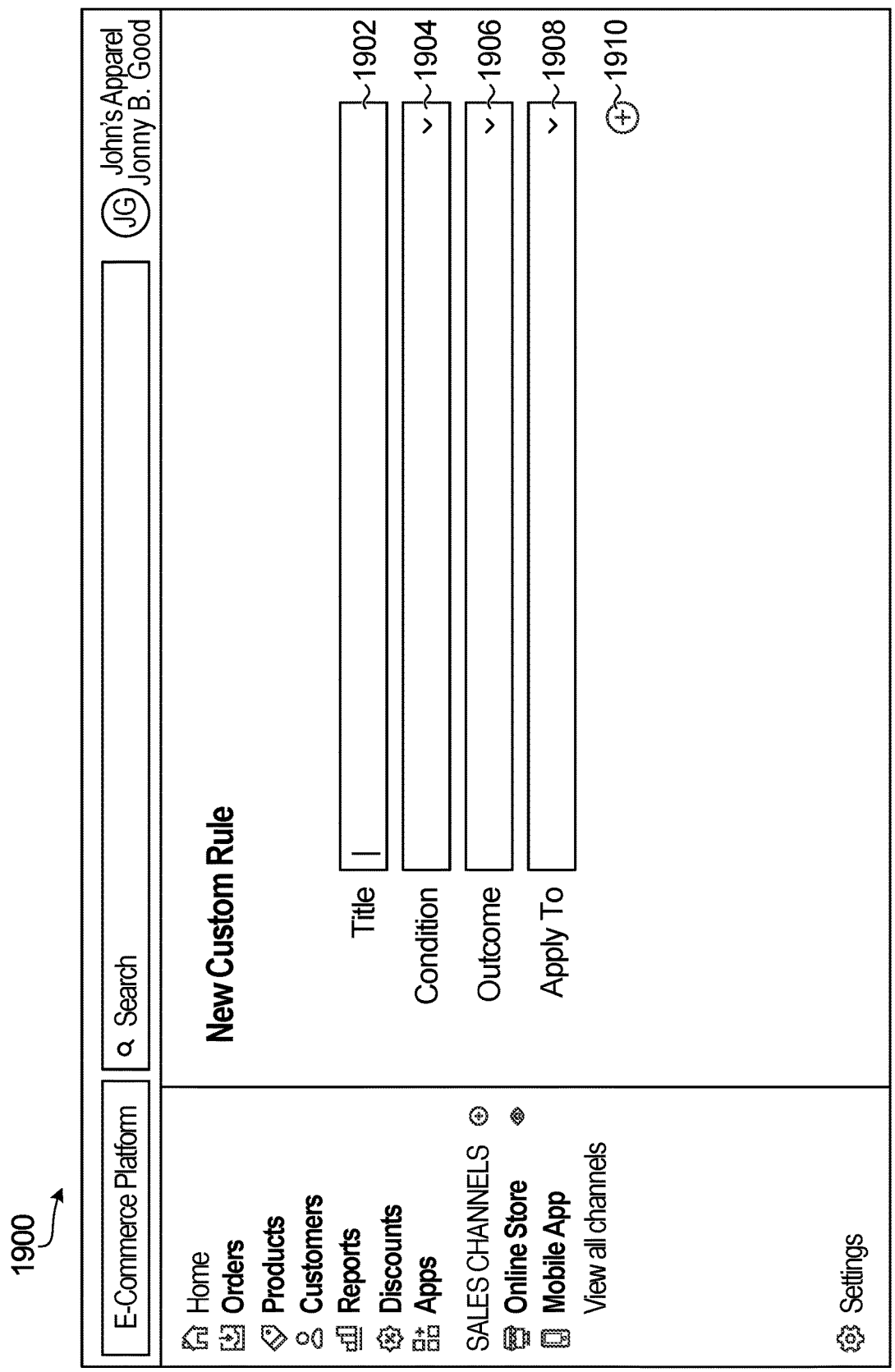

FIG. 19 is an example interface 1900 for adding a new rule using a fully custom rule. The interface 1900 will provide the merchant fields for the title 1902, condition 1904, outcome 1906 and application range 1908. For products that fall within an application range 1908, the information derived from the incoming web request is used by a rule executor to determine if the condition 1904 for the rule is met. If the condition is met, the rule executor instructs the network interface to process the web request according to the outcome 1906. Once the user determines the values for the fields they can use the add rule button 1910. This would instruct rule generator 608 to store the rule in a memory to be applied to web traffic.

Example Methods

Figure 20:
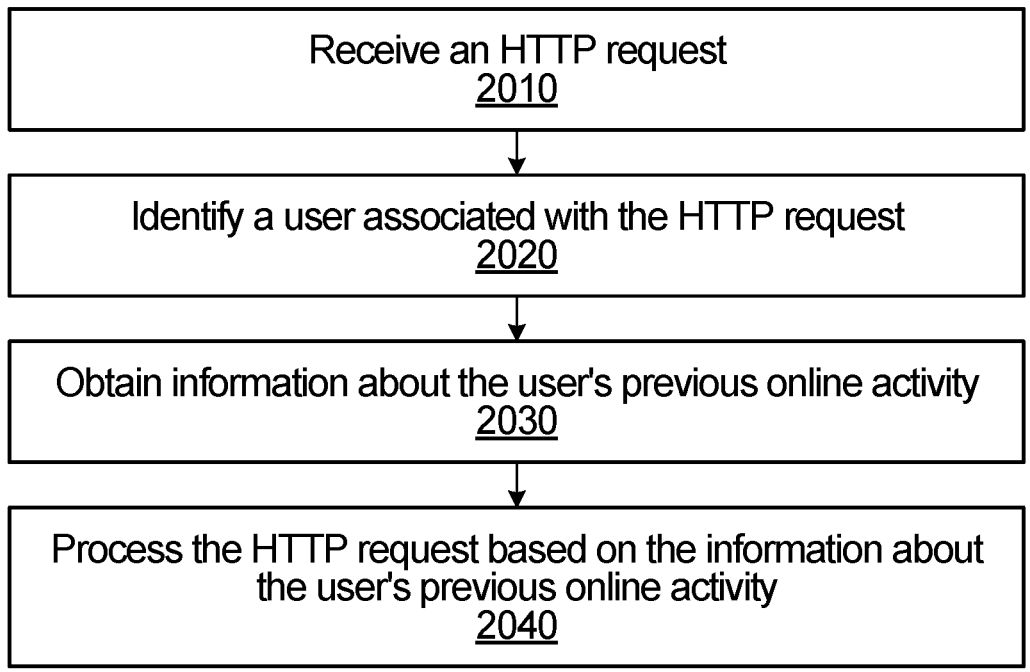
FIGS. 20 to 23 are computer-implemented methods, according to various embodiments.

FIG. 20 is a computer-implemented method performed at a firewall, according to one embodiment. The method may be performed by firewall 308.

At step 2010, an HTTP request is received, e.g. by a network interface of the firewall (e.g. network interface 706). The HTTP request may be received through a network port over a TCP/IP connection. In some embodiments, the HTTP request is sent through a network interface of a user device, is transmitted over the network and is received through the network interface of the firewall. In some embodiments, the HTTP request may include information about the user device, e.g. layer 7 and/or layer 3 information. In some embodiments, the HTTP request may include information about the user, such as information embedded in a cookie.

At step 2020, a user is identified that is associated with the HTTP request. A "user" may be a user device or an entity independent of a particular user device (e.g. a customer registered in the e-commerce platform). In some embodiments, identifying the user associated with the HTTP request may include extracting a unique ID from the HTTP request or from one or more packets associated with the HTTP request, and identifying the user from the unique ID. For example, the unique ID may be a user ID in a cookie of the HTTP request. The cookie may be extracted from the HTTP request, and the user ID mapped to a particular user, e.g. via a look-up table. As another example, the unique ID may be the IP address of the user device from which the HTTP request was received. The IP address of the user device is included as part of one or more packets carrying the HTTP request. The IP address of the user device may be mapped to a particular user, e.g. via a look-up table. As another example, the unique ID may be a browser ID associated with the user device from which the HTTP request was received, e.g. the browser ID may be included in the HTTP request and mapped by the firewall to a particular user, e.g. via a look-up table. In some embodiments, identifying the user associated with the HTTP request may include extracting layer 3, 4, and/or 7 data from the HTTP request and comparing the data with information stored about user interactions.

At step 2030, information about the user's previous online activity is then obtained. In some embodiments, once the user associated with the HTTP request is identified, that user's ID is used to obtain stored information about the user's previous online activity (e.g. the user's ID may be used to query any of the tables in FIGS. 8 to 12 in which the user's online activity information is stored). In some embodiments, a query may have to be sent from the firewall to the e-commerce platform to obtain the information about the user's previous online activity, e.g. the user's ID is transmitted from the firewall to the e-commerce platform along with a request for the user's previous online activity, and in response the e-commerce platform retrieves the user's previous online activity information from memory and transmits it to the firewall. In other embodiments, the information about users' previous online activity is stored locally at the firewall, e.g. it may be pushed to the firewall on a periodic basis. Having a user's previous online activity stored locally at the firewall may allow for the user's previous online activity to be retrieved faster compared to sending a request to the e-commerce platform.

A user's online activity must be tracked and retrievable to allow for a user's previous online activity to be available to the firewall. In some embodiments, the e-commerce platform includes information about each user, which has been tracked over time, e.g. the information shown in the tables in FIGS. 8 to 12. The information stored about user online activity is tracked for the users throughout their interactions with either the e-commerce platform or with other platforms (e.g. with a social media platform). In some embodiments, obtaining information about the user's previous online activity may include retrieving the information from memory and/or requesting the information from an e-commerce platform or a social media platform. The information on a particular user's previous online activity may be pulled from the e-commerce platform as needed, or periodically pushed to the firewall. In some embodiments, some or all of the information about the user's previous online activity may be included/encoded in the HTTP request, e.g. in a header of the HTTP request, such as in a cookie.

In some embodiments, the user's previous online activity is or includes the user's previous online activity on the e-commerce platform, e.g. "an item was added to the online cart at 09:13 22sec 12/3/2019". However, the user's previous online activity does not necessarily have to be on the e-commerce platform, e.g. "user follows Merchant A on Facebook™". In some embodiments, if the user's previous online activity is not online activity on the e-commerce platform, then the e-commerce platform may not know about the previous online activity. To obtain such online activity information in these situations, information associated with the identity of the user (e.g. the user's email address) may be sent to a $3^{rd}$ party service that provides the online activity information for the user. The $3^{rd}$ party service may be a social media platform itself. For example, the user's email address stored in the e-commerce platform may be used to send a request to Facebook™. The request asks for a list of Facebook™ users that the user associated with the email address follows.

Some examples of information about the user's previous online activity are described in relation to FIGS. 8 to 12. Some examples of the information about the user's previous online activity on the e-commerce platform includes information specifying at least one of: a last time the user accessed the e-commerce platform (e.g. "last visit from user A was webpage Y of Merchant X, accessed at 3:52pm 33 sec on 12/03/2019"); a last time the user added a product to an online cart on the e-commerce platform (e.g. "Product C added by user A to cart for online store of Merchant X at 3:09pm 17 sec on 12/03/2019"); whether the user is a return visitor to the e-commerce platform (e.g. if the user is found in the database that tracks user online activity in the e-commerce platform, then the user must have previously visited the e-commerce platform, otherwise the user is added as a new user to the database); whether the user is a return customer on the e-commerce platform (e.g. it may be tracked in memory whether the user is a return customer generally or for a particular merchant, e.g. a list of purchases made by the user for each merchant is stored, and if the list is empty then the user is not a return customer); a previous merchant webpage visited by the user (e.g. the URL of each webpage visited by the user may be stored for each user and associated with a timestamp of the visit); a previous purchase made by the user within the e-commerce platform; whether the user has previously visited a webpage of a particular merchant on the e-commerce platform; whether the user is registered with the e-commerce platform (e.g. does user have an account).

At step 2040, the HTTP request is processed based on the information about the user's previous online activity. In some embodiments, processing the HTTP request may include: allowing the HTTP request (e.g. allowing the HTTP request to proceed to a destination of the HTTP request, possibly with an imposed delay); or denying/blocking the HTTP request (e.g. not allowing the HTTP request to proceed to a destination of the HTTP request); or routing or rerouting the HTTP request to a particular server (e.g. a particular web server for preferential treatment, such as a server that has more computational resources and thereby executes the request faster).

In some embodiments, determining how the HTTP request is processed is based on rules previously defined. The firewall may access what rules have been defined for the specific merchant. Alternatively, there may be some rules that are universal, i.e. apply to all merchants within the e-commerce platform and are not associated with a specific merchant. Rules may specify how the information both received in the incoming HTTP request, and stored based on tracked user activity, should be used to determine how the request is handled. Therefore, in some embodiments, processing the HTTP request may include comparing the information about the user's previous online activity to a rule, and processing the HTTP request according to the rule. The rule may be received from the e-commerce platform, e.g. the firewall may query the e-commerce platform to request the rules for a particular user and/or merchant on an as-needed basis, or the e-commerce platform may push rules to the firewall for local storage (which may allow for step 2040 to be executed more quickly if the rules are only retrieved from local storage and not requested in real-time from the e-commerce platform).

In some embodiments, a rule is specific to a particular merchant on the e-commerce platform, and the method further includes: identifying the particular merchant from the HTTP request and retrieving the rule based on the identification of the particular merchant. Identifying the particular merchant from the HTTP request may include identifying the particular merchant based on at least part of a URL in the HTTP request. For example, the HTTP request may specify a particular resource on the e-commerce platform that the user device sending the HTTP request wishes to access. The particular resource may be associated with a particular merchant (e.g. a webpage of an online store belonging to a particular merchant). The identification of the particular resource in the HTTP request may be used to identify the particular merchant associated with the resource (e.g. the domain name or subdomain name or path in the URL may be mapped by the firewall to a particular merchant, e.g. by using a look-up table directly stored in the firewall, or by sending a query to the e-commerce platform that provides the e-commerce platform with the information in the HTTP requested needed to identify the merchant). Once the particular merchant is identified, the rules specific to that merchant may be implemented/executed by the firewall.

Examples of rules that may be implemented/executed by the firewall as part of processing the HTTP request are described in relation to FIG. 13. Some examples include: (1) If HTTP request is "add to cart" and if an item was added to the cart by user less than X seconds ago, then block request; (2) If HTTP request is "add to cart" for a particular merchant's online store, and if user has not yet visited that merchant's homepage, then allow request with a 10 ms delay; (3) If HTTP request originates from a different country from previous HTTP request from same user (e.g. based on change in IP address), then allow request with a 10 ms delay; (4) If user already registered with e-commerce platform, then allow request and reroute request to web server B (e.g. a faster server hosting the web app).

The firewall includes components that perform the functions of the firewall described above in relation to FIG. 20. For example, the firewall may include a network interface to receive the HTTP request (e.g. network interface 706 of FIG. 7). As another example, the firewall may include a processor that performs steps 2020 to 2040. The processor may be a general purpose processor that executes instructions stored in memory or specific processing circuitry (e.g. ASIC, GPU, FPGA). The processor may implement the rule executor 704 of FIG. 7, where the rule executor 704 performs the functions of identifying the user associated with the HTTP request, obtaining information about the user's previous online activity, and processing the HTTP request based on the information about the user's previous online activity.

Figure 21:
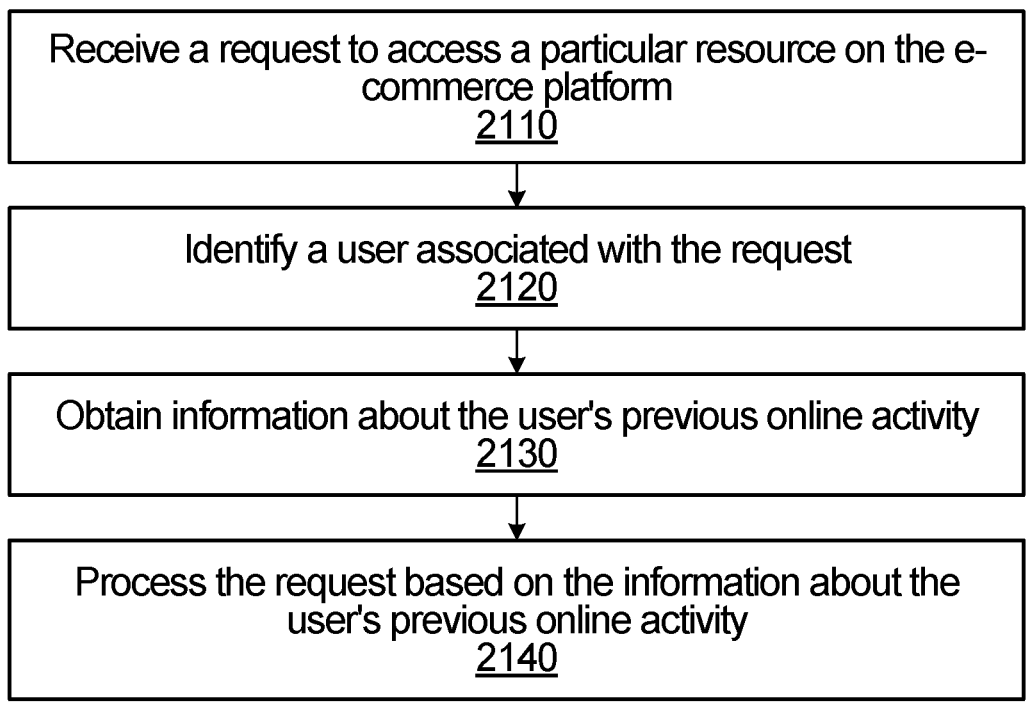

FIG. 21 is a computer-implemented method, according to another embodiment. The method may be performed by a computing device (e.g. a processor, which may be a general purpose processor that executes instructions stored in memory or specific processing circuitry, such as an ASIC, GPU, or FPGA). In some embodiments, the method may be implemented in an e-commerce platform, e.g. by rule executor 610 in e-commerce platform 602.

At step 2110, a request is received to access a particular resource on the e-commerce platform. The request originates from a user device. The request may be received by a network interface of the e-commerce platform (e.g. network interface 606). The request may be an HTTP request. For example, the request may be received through a network port over a TCP/IP connection.

In some embodiments, the particular resource is a particular function on the e-commerce platform, e.g. an "add-to-cart" function or a "check-out" function. For example, the request received at step 2110 may be a request to add a product to an online cart, which may be the result of the user selecting the "add to cart" element on the user interface of the user device. As another example, the request received at step 2110 may be a request to initiate (e.g. submit) a purchase of a product, which may be the result of the user selecting the "checkout" element on the user interface of the user device.

In some embodiments, the particular resource on the e-commerce platform is a particular webpage, e.g. a particular merchant webpage. For example, the request received at step 2110 may be a request to access a particular product page, a particular collections page, a particular landing page, etc.

In some embodiments, the URL of the particular resource is included in the request, which allows the particular resource to be identified. The URL may also be used to identify a particular merchant associated with that URL.

At step 2120, a user is identified that is associated with the request. A "user" may be the user device or an entity independent of a particular user device (e.g. a customer registered in the e-commerce platform). In some embodiments, identifying the user associated with the request may include extracting a unique ID from the request or from one or more packets associated with the request, and identifying the user from the unique ID. For example, the unique ID may be a user ID in a cookie of the request. The cookie may be extracted from the request, and the user ID mapped to a particular user, e.g. via a look-up table. As another example, the unique ID may be the IP address of the user device from which the request was received. The IP address of the user device is included as part of one or more packets carrying the request. The IP address of the user device may be mapped to a particular user, e.g. via a look-up table. As another example, the unique ID may be a browser ID associated with the user device from which the request was received, e.g. the browser ID may be included in the request and mapped to a particular user, e.g. via a look-up table.

At step 2130, information is obtained about the user's previous online activity. In some embodiments, once the user associated with the request is identified, that user's ID is used to retrieve stored information about the user's previous online activity (e.g. the user's ID may be used to query any of the tables in FIGS. 8 to 12 in which the user's online activity is stored). The information about the user's previous online activity may be stored within the e-commerce platform itself, e.g. in memory 614. In some embodiments, the e-commerce platform includes information about each user that has been tracked over time, e.g. the information shown in the tables in FIGS. 8 to 12. The information stored about user online activity is tracked for the users throughout their interactions with either the e-commerce platform or with other platforms (e.g. with a social media platform).

In some embodiments, obtaining information about the user's previous online activity may include retrieving the information from memory (e.g. memory on the e-commerce platform) and/or requesting some or all of the information from a social media platform. In some embodiments, some or all of the information about the user's previous online activity may be included/encoded in the request, e.g. in a header of the request, such as in a cookie.

In some embodiments, the user's previous online activity is or includes the user's previous online activity on the e-commerce platform, e.g. "user has already purchased product A". However, the user's previous online activity does not necessarily have to be on the e-commerce platform, e.g. "user follows Merchant A on Facebook™". In some embodiments, if the user's previous online activity is not online activity on the e-commerce platform, then the e-commerce platform may not know about the previous online activity. To obtain such online activity information in these situations, information associated with the identity of the user (e.g. the user's email address) may be sent to a 3$^{rd}$ party service that provides the online activity information for the user. The 3$^{rd}$ party service may be a social media platform itself. For example, the user's email address stored in the e-commerce platform may be used to send a request to Facebook™. The request asks for a list of Facebook™ users that the user associated with the email address follows.

Some examples of information about the user's previous online activity are described in relation to FIGS. 8 to 12. Some examples of the information about the user's previous online activity on the e-commerce platform includes information specifying at least one of: a previous merchant webpage visited by the user (e.g. the URL of each webpage visited by the user may be stored for each user and associated with a timestamp of the visit); a previous purchase made by the user within the e-commerce platform; whether the user has previously visited a webpage of a particular merchant on the e-commerce platform; whether the user is registered on the e-commerce platform (e.g. does user have an account); whether the user is a return visitor to the e-commerce platform (e.g. if the user is found in the database that tracks user online activity in the e-commerce platform, then the user must have previously visited the e-commerce platform, otherwise the user is added as a new user to the database); whether the user is a return customer on the e-commerce platform (e.g. it may be tracked in memory whether the user is a return customer generally or for a particular merchant, e.g. a list of purchases made by the user for each merchant is stored, and if the list is empty then the user is not a return customer); whether the user has previously purchased a product from a particular merchant on the e-commerce platform; amount of money spent on purchasing one or more products from a particular merchant on the e-commerce platform.

At step 2140, the request is processed based on the information about the user's previous online activity. In some embodiments, processing the request may include: providing access to the resource (e.g. if the request is to access a particular webpage, then the e-commerce platform returns the webpage to the user, or e.g. if the request is to add a product to an online cart, then the e-commerce platform adds the product to the online cart); and/or providing a modified version of the resource (e.g. user requests a collections webpage, and based on the user's previous online activity a modified version of the collections webpage is returned in which product B is included at the top of the collections webpage and/or product C is omitted from the collections page); and/or prioritizing access to the resource over other users (e.g. the user's request is processed ahead of the requests of other users and/or the user's request is processed on a faster server). In some embodiments, processing the request may include denying access to the resource (e.g. webpage or function requested by user is hidden or denied).

In some embodiments, determining how the request is processed is based on rules previously defined. The e-commerce platform may access what rules have been defined for a specific merchant. Alternatively, there may be some rules that are universal, i.e. apply to all merchants within the e-commerce platform and are not associated with a specific merchant. Rules may specify how the information both received in the incoming request, and stored based on tracked user activity, should be used to determine how the request is handled. Therefore, in some embodiments, processing the request may include comparing the information about the user's previous online activity to a rule, and processing the request according to the rule.

In some embodiments, a rule is specific to a particular merchant on the e-commerce platform, and the method further includes: identifying the particular merchant from the request and retrieving the rule based on the identification of the particular merchant. Identifying the particular merchant from the request may include identifying the particular merchant based on at least part of a URL in the request. For example, the request may specify a particular resource on the e-commerce that the user device sending the request wishes to access. The particular resource may be associated with a particular merchant (e.g. a webpage of an online store belonging to a particular merchant). The identification of the particular resource in the request may be used to identify the particular merchant associated with the resource (e.g. the domain name or subdomain name or path in the URL may be mapped to a particular merchant, e.g. by using a look-up table). Once the particular merchant is identified, the rules specific to that merchant may be implemented/executed by the e-commerce platform.

Examples of rules that may be implemented/executed as part of processing the request are described in relation to FIG. 14. Some examples include: (1) If user bought previous product B/viewed previous product B/watched video X/follows merchant Y, then show product A (e.g. show additional SKUs of product A on requested webpage, or return requested product page for product A); (2) If the user has already purchased product A, then show them product B on product collection page and/or grant request to add product B to cart; (3) If user has purchased over $1000 across all merchants within the e-commerce platform, then allow user to access particular merchant products and prioritize user's request over other users; (4) Show additional inventory of product B if the user follows the merchant on Facebook™.

The e-commerce platform includes components that perform the functions of the e-commerce platform described above in relation to FIG. 21. For example, the e-commerce platform may include a network interface to receive the request (e.g. network interface 606 of FIG. 6). As another example, the e-commerce platform may include a processor that performs steps 2120 to 2140. The processor may be a general purpose processor that executes instructions stored in memory or specific processing circuitry (e.g. ASIC, GPU, FPGA). The processor may implement the rule executor 610 of FIG. 6, where the rule executor 610 performs the functions of identifying a user associated with the request, obtaining information about the user's previous online activity, and processing the request based on the information about the user's previous online activity.

Figure 22:
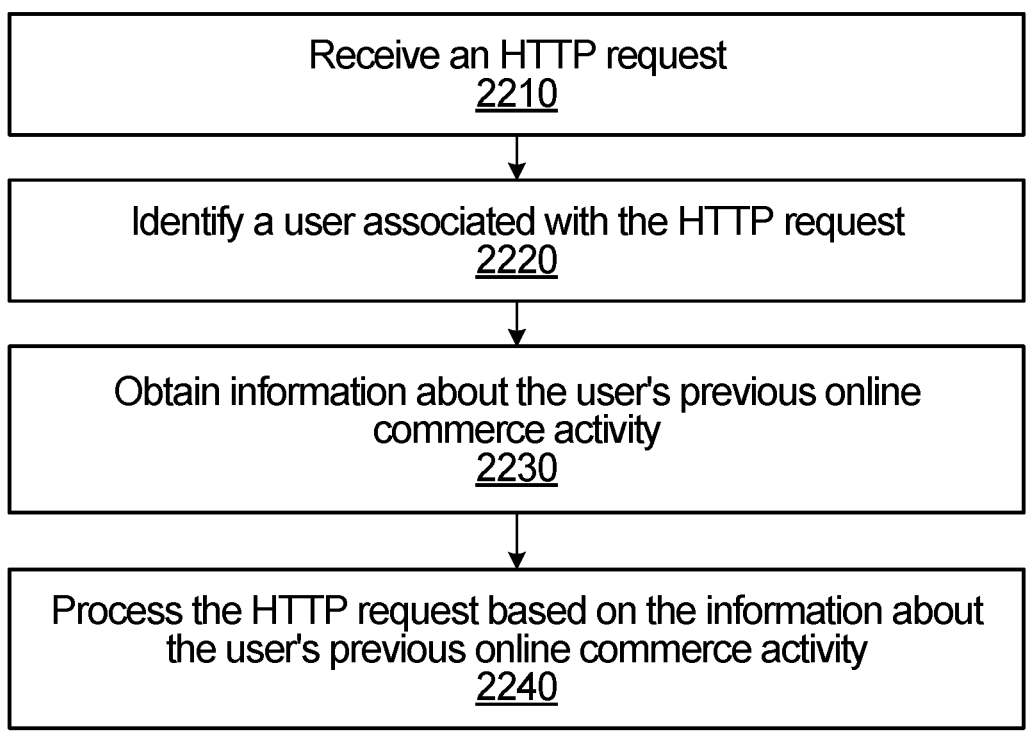

FIG. 20 is a method of web traffic control performed at a firewall (e.g. firewall 308), whereas FIG. 21 is a method of web traffic control performed at the web-app level in the e-commerce platform, e.g. by rule executor 610 in e-commerce platform 602. More generally, FIG. 22 is a computer-implemented method that may be performed at the firewall or at the web-app in the e-commerce platform, or in another environment not tied to an e-commerce platform (e.g. in relation to an individual merchant's site that is not associated with an e-commerce platform). The method of FIG. 22 may be performed by a computing device (e.g. a processor, which may be a general purpose processor that executes instructions stored in memory or specific processing circuitry, such as an ASIC, GPU, or FPGA).

At step 2210, an HTTP request is received, e.g. by a network interface (e.g. network interface 706 or 606). The HTTP request may be received through a network port over a TCP/IP connection. In some embodiments, the HTTP request is sent through a network interface of a user device, is transmitted over the network and is received through the network interface of the computing device performing the method of FIG. 22. In some embodiments, the HTTP request may include information about the user device, e.g. layer 7 and/or layer 3 information. In some embodiments, the HTTP request may include information about the user, such as information embedded in a cookie.

At step 2220, a user is identified that is associated with the HTTP request. A "user" may be a user device or an entity independent of a particular user device (e.g. a customer registered with the merchant or registered in the e-commerce platform). In some embodiments, identifying the user associated with the HTTP request may include extracting a unique ID from the HTTP request or from one or more packets associated with the HTTP request, and identifying the user from the unique ID. For example, the unique ID may be a user ID in a cookie of the HTTP request. The cookie may be extracted from the HTTP request, and the user ID mapped to a particular user, e.g. via a look-up table. As another example, the unique ID may be the IP address of the user device from which the HTTP request was received. The IP address of the user device is included as part of one or more packets carrying the HTTP request. The IP address of the user device may be mapped to a particular user, e.g. via a look-up table. As another example, the unique ID may be a browser ID associated with the user device from which the HTTP request was received, e.g. the browser ID may be included in the HTTP request and mapped to a particular user, e.g. via a look-up table. In some embodiments, identifying the user associated with the HTTP request may include extracting layer 3, 4, and/or 7 data from the HTTP request and comparing the data with information stored about user interactions.

At step 2230, information about the user's previous online commerce activity is then obtained. A user's previous online commerce activity is online activity that has some relation to commerce. A user's online commerce activity encompasses the user interacting with one or products (e.g. the user viewing a product page for a product, buying a product, adding a product to a cart, etc.) and also encompass the user interacting with one or more merchants that sell products (e.g. the user viewing a merchant home page, following a merchant on social media, etc.).

In some embodiments, once the user associated with the HTTP request is identified, that user's ID is used to obtain stored information about the user's previous online commerce activity (e.g. the user's ID may be used to query any of the tables in FIGS. 8 to 12 in which the user's online activity information is stored).

A user's online commerce activity must be tracked and retrievable to allow for a user's previous online commerce activity to be available. In some embodiments, an e-commerce platform includes information about each user, which has been tracked over time, e.g. the information shown in the tables in FIGS. 8 to 12. The information stored about user online activity is tracked for the users throughout their interactions with either the e-commerce platform or with other platforms (e.g. with a social media platform). In some embodiments, obtaining information about the user's previous online commerce activity may include retrieving the information from memory and/or requesting the information from an e-commerce platform or a social media platform. In some embodiments, some or all of the information about the user's previous online commerce activity may be included/encoded in the HTTP request, e.g. in a header of the HTTP request, such as in a cookie.

In some embodiments, the user's previous online commerce activity is or includes the user's previous online activity on an e-commerce platform, e.g. "an item was added to the online cart at 09:13 22sec 12/3/2019". However, the user's previous online commerce activity does not necessarily have to be on the e-commerce platform, e.g. "user follows Merchant A on Facebook™", or when the merchant has an individual site that is not associated with an e-commerce platform. In some embodiments, if the method is performed by an e-commerce platform and the user's previous online commerce activity is not online activity on the e-commerce platform, then the e-commerce platform may not know about the previous online commerce activity. To obtain such online commerce activity information in these situations, information associated with the identity of the user (e.g. the user's email address) may be sent to a $3^{rd}$ party service that provides the online activity information for the user. The $3^{rd}$ party service may be a social media platform itself. For example, the user's email address stored in the e-commerce platform may be used to send a request to Facebook™. The request asks for a list of Facebook™ users that the user associated with the email address follows. The information returned from Facebook™ may include an indication that the user follows merchant A. Such an indication is an example of information about the user's previous online commerce activity.

Some examples of information about the user's previous online commerce activity are described in relation to FIGS. 8 to 12. Some examples of the information about the user's previous online commerce activity on the e-commerce platform includes information specifying at least one of: a last time the user accessed the e-commerce platform (e.g. "last visit from user A was webpage Y of Merchant X, accessed at 3:52pm 33 sec on 12/03/2019"); a last time the user added a product to an online cart on the e-commerce platform (e.g. "Product C added by user A to cart for online store of Merchant X at 3:09pm 17 sec on 12/03/2019"); whether the user is a return visitor to the e-commerce platform (e.g. if the user is found in the database that tracks user online activity in the e-commerce platform, then the user must have previously visited the e-commerce platform, otherwise the user is added as a new user to the database); whether the user is a return customer on the e-commerce platform (e.g. it may be tracked in memory whether the user is a return customer generally or for a particular merchant, e.g. a list of purchases made by the user for each merchant is stored, and if the list is empty then the user is not a return customer); a previous merchant webpage visited by the user (e.g. the URL of each webpage visited by the user may be stored for each user and associated with a timestamp of the visit); a previous purchase made by the user within the e-commerce platform; whether the user has previously visited a webpage of a particular merchant on the e-commerce platform; whether the user is registered with the e-commerce platform (e.g. does user have an account); purchase timing (e.g. when the user previously purchased a particular product); amount of money spent on purchasing one or more products from a particular merchant on the e-commerce platform; whether the user has previously purchased a product from a particular merchant on the e-commerce platform.

At step 2240, the HTTP request is processed based on the information about the user's previous online commerce activity. In some embodiments, processing the HTTP request may include: allowing the HTTP request (e.g. allowing the HTTP request to proceed to a destination of the HTTP request, possibly with an imposed delay); or denying/blocking the HTTP request (e.g. not allowing the HTTP request to proceed to a destination of the HTTP request); or routing or rerouting the HTTP request to a particular server (e.g. a particular web server for preferential treatment, such as a server that has more computational resources or lower load and thereby executes the request faster); or providing access to a resource requested in the HTTP request; or denying access to the resource requested in the HTTP request; or providing a modified version of the resource requested in the HTTP request. In some embodiments, a resource may be a particular function on the e-commerce platform, e.g. an "add-to-cart" function or a "check-out" function. In some embodiments, a resource may be a particular webpage, e.g. a particular merchant webpage. In some embodiments, the URL of the particular resource is included in the request, which allows the particular resource to be identified. The URL may also be used to identify a particular merchant associated with the resource.

In some embodiments, determining how the HTTP request is processed is based on rules previously defined. The computing device may access what rules have been defined for the specific merchant. Alternatively, there may be some rules that are universal, i.e. apply to all merchants within the e-commerce platform and are not associated with a specific merchant. Rules may specify how the information both received in the incoming HTTP request, and stored based on tracked user activity, should be used to determine how the request is handled. Therefore, in some embodiments, processing the HTTP request may include comparing the information about the user's previous online commerce activity to a rule, and processing the HTTP request according to the rule.

In some embodiments, a rule is specific to a particular merchant on the e-commerce platform, and the method further includes: identifying the particular merchant from the HTTP request and retrieving the rule based on the identification of the particular merchant. Identifying the particular merchant from the HTTP request may include identifying the particular merchant based on at least part of a URL in the HTTP request. For example, the HTTP request may specify a particular resource on the e-commerce platform that the user device sending the HTTP request wishes to access. The particular resource may be associated with a particular merchant (e.g. a webpage of an online store belonging to a particular merchant). The identification of the particular resource in the HTTP request may be used to identify the particular merchant associated with the resource (e.g. the domain name or subdomain name or path in the URL may be mapped to a particular merchant, e.g. by using a look-up table). Once the particular merchant is identified, the rules specific to that merchant may be implemented/executed.

Examples of rules that may be implemented/executed as part of processing the HTTP request are described in relation to FIGS. 13 and 14. Some examples include: (1) If HTTP request is "add to cart" and if an item was added to the cart by user less than X seconds ago, then block request; (2) If HTTP request is "add to cart" for a particular merchant's online store, and if user has not yet visited that merchant's homepage, then allow request with a 10 ms delay; (3) If HTTP request originates from a different country from previous HTTP request from same user (e.g. based on change in IP address), then allow request with a 10 ms delay; (4) If user already registered with e-commerce platform, then allow request and reroute request to web server B (e.g. a faster server hosting the web app); (5) If user bought previous product B/viewed previous product B/watched video X/follows merchant Y, then show product A (e.g. show additional SKUs of product A on requested webpage, or return requested product page for product A); (6) If the user has already purchased product A, then show the user product B on product collection page and/or grant the user's request to add product B to cart; (7) If user has purchased over $1000 across all merchants within the e-commerce platform, then allow user to access particular merchant products and prioritize user's request over other users; (8) Show additional inventory of product B if the user follows the merchant on Facebook™.

In some embodiments, the method of FIG. 22 may include obtaining a social network status associated with the user (e.g. whether the user follows a particular merchant, and/or the number of followers the user has, etc.). The HTTP request may then also or instead be processed based on the social network status of the user.

Figure 23:
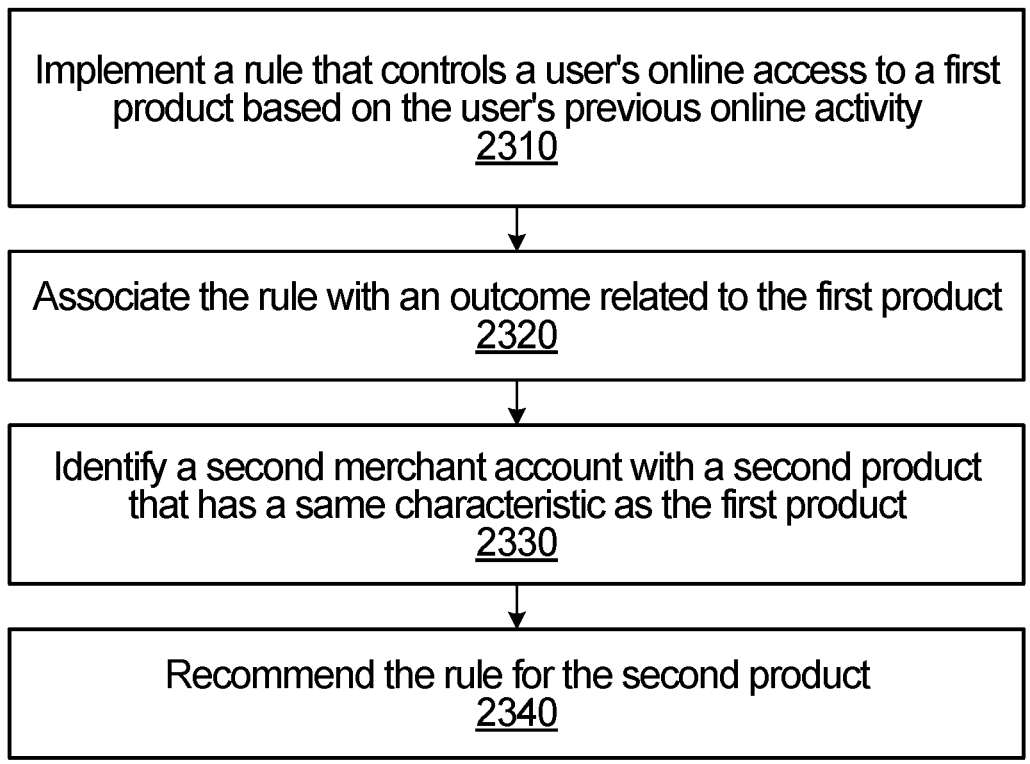

The computing device includes components that perform the functions described above in relation to FIG. 22. For example, the computing device may include a network interface to receive the HTTP request (e.g. network interface 606 or 706). As another example, the computing device may include a processor that performs steps 2220 to 2240. The processor may be a general purpose processor that executes instructions stored in memory or specific processing circuitry (e.g. ASIC, GPU, FPGA). In some embodiments, the processor may implement the rule executor 610 of FIG. 6 or the rule executor 704 of FIG. 7, where the rule executor performs the functions of identifying the user associated with the HTTP request, obtaining information about the user's previous online commerce activity, and processing the HTTP request based on the information about the user's previous online commerce activity FIG. 23 is a computer-implemented method, according to another embodiment. The method may be performed by a computing device (e.g. a processor, which may be a general purpose processor that executes instructions stored in memory or specific processing circuitry, such as an ASIC, GPU, or FPGA). In some embodiments, the method may be implemented in an e-commerce platform, e.g. at least in part by rule recommender 612 in e-commerce platform 310.

At step 2310, a rule is implemented that, based on a user's previous online activity (e.g. based on a user's previous online commerce activity), controls the user's online access to a first product. The first product is associated with a first merchant account on the e-commerce platform. For example, the first product may be offered for sale by the merchant of the first merchant account. The rule may be implemented by storing the rule in memory (e.g. as an if-then conditional statement in a table, such as in table 1300 in FIG. 13 or table 1400 in FIG. 14), and then determining whether the condition specified in the rule is met when a web request (e.g. HTTP request) is received. Determining whether the condition is met may include identifying the user from the information in the web request, using the identity of the user to retrieve the user's previous online activity from memory, and comparing the user's previous online activity to the condition in the rule. When the condition is met, the web request is processed according to the instructions specified in the rule. Examples of such rules are described at least in relation to FIG. 13 and FIG. 14. For example, the rule may prevent a user from viewing a product page for the first product unless a condition related to the user's previous online commerce activity is met (e.g. only allow user to view product A if user previously purchased product B). As another example, the rule may prevent a user from adding the first product to an online cart unless a condition related to the user's previous online commerce activity is met (e.g. only allow user to add product A to online cart if user previously visited home page for merchant B). As another example, the rule may prevent a user from initiating a purchase of the first product unless a condition related to the user's previous online commerce activity is met (e.g. only allow user to purchase product A if user follows merchant B on Instagram™). As another example, the rule may make additional inventory of the first product available to a user when a condition related to the user's previous online commerce activity is met (e.g. make additional inventory of product A available for purchase to user if the user has signed up for marketing email communications from the merchant selling product A). As another example, the rule may cause the first product to be placed at a particular location on a webpage based on the user's previous online commerce activity (e.g. if user previously purchased a children's fashion item, then put other children fashion items at the top of the "new items" merchant webpage). Other examples of controlling a user's online access to the first product include: presenting or withholding additional inventory of the first product; and/or allowing or not allowing the first product to be added to cart (and/or purchased); and/or surfacing the first product on a merchant webpage in a particular way (e.g. placing the first product as the first item on a collection page); and/or prioritizing or deprioritizing the user's request to view or purchase the first product in relation to competing requests from other users (e.g. add a delay to a user's request to view or purchase the first product); and/or allowing, blocking, or delaying an HTTP request from the user that requests a particular resource related to the first product (e.g. that requests a product web page for the first product, or that requests a particular function be performed in relation to the first product, such as adding the first product to an online cart or purchasing the first product). In some embodiments, the rule is implemented at a firewall. In other embodiments, the rule is implemented in a web application on the e-commerce platform.

At step 2320, the rule is associated with an outcome related to the first product. In some embodiments, step 2320 is implemented as follows to associate the rule with the outcome. The e-commerce platform first tracks information (e.g. statistics) related to the first product (e.g. sales of first product and/or number of web page views of first product) once the rule is implemented. The rule is then associated with an outcome of the tracked information compared to before the rule was implemented (e.g. the tracked information surpassing a certain threshold compared to before the rule was implemented). For example, the e-commerce platform may track sales of the first product after the rule is implemented compared to before the rule is implemented. If the sales of the first product increase by a predetermined amount after the rule is implemented compared to before the rule was implemented, then an outcome is identified as increased sales of the first product. The rule is associated with the outcome by storing in memory an indication that the rule resulted in increased sales of the first product.

In some embodiments, the outcome may be one or more of the following: an increase in webpage views of a product page for the first product after the rule is implemented for the first merchant account (e.g. after the rule is implemented the product page for the first product is viewed on average 2.4 times more each day compared to before the rule was implemented); and/or an increase in online sales of the first product after the rule is implemented for the first merchant account (e.g. after the rule is implemented online sales of the first product increase by 350% compared to before the rule was implemented); and/or an increase in positive online feedback for the first product after the rule is implemented for the first merchant account (e.g. after the rule is implemented the percentage of 5-star ratings for the first product doubles compared to before the rule was implemented); and/or an increase in a number of preferred users that purchased the first product after the rule is implemented for the first merchant account (e.g. after the rule is implemented the percentage of users located in California that purchase the first product double compared to before the rule was implemented); and/or an increase in a number of preferred users that viewed a web page featuring the first product after the rule is implemented for the first merchant account (e.g. after the rule is implemented the percentage of users that follow the merchant on Facebook™ and that viewed a product page for the first product increased by 25% compared to before the rule was implemented). A web page featuring the first product may be a product page for the first product, a collections page including the first product, or any other webpage that includes content related to the first product.

In some embodiments, a "preferred user" is a user designated by the merchant as having a particular attribute different from at least some of the other users. In some embodiments, a preferred user may be any one or more of the following: a user using a user device associated with a particular location; a user who has previously purchased a particular product; a user who has previously viewed a particular web page; a user who has previously spent at least a particular amount of money purchasing one or more products on the e-commerce platform; a user who is registered with the e-commerce platform (e.g. has a customer account with the e-commerce platform); a user who has previously made a purchase on the e-commerce platform; a user who follows a particular merchant on social media; a user that arrived at a webpage of the e-commerce platform from a particular one or more online advertisements (e.g. users who arrived on the product page from clicking a link on a Facebook™ ad).

In some embodiments, the rule controls the user's online access to the first "Include the first product at the top of the first merchant's product collection page if the user previously bought product A from the first merchant"). However, the user's previous online commerce activity does not necessarily have to be on the e-commerce platform, e.g. the user's previous online commerce activity may be on an individual merchant's site that is not associated with an e-commerce platform. More generally, the user's previous online activity does not even have to be commerce related (e.g. "If the user is located in New York City, then allow the user to purchase the first product"). In some embodiments, if the method is performed on an e-commerce platform, and if the user's previous online activity is not online activity on the e-commerce platform, then the e-commerce platform may not know about the previous online activity. To obtain such online activity information in these situations, information associated with the identity of the user (e.g. the user's email address) may be sent to a $3^{rd}$ party service that provides the online activity information for the user. The $3^{rd}$ party service may be a social media platform itself. For example, the user's email address stored in the e-commerce platform may be used to send a request to Facebook™. The request asks for a list of Facebook™ users that the user associated with the email address follows.

At step 2330, a second merchant account (different from the first merchant account) is identified on the platform having associated therewith a second product that is offered for sale and that has a same characteristic as the first product. In some embodiments, the second product has the same characteristic as the first product when the second product and the first product are of the same product type or product category (e.g. both the first product and the second product are shoes, or both the first product and the second product are outerwear, etc.). In some embodiments, the second product has the same characteristic as the first product when the second product and the first product have a same designation in the e-commerce platform. Examples of such a designation include: product discounted; and/or product inventory above a particular threshold; and/or product inventory below a particular threshold; and/or product inventory available for sale for more than a particular number of days; and/or product has time-limited availability for sale; and/or product associated with a flash sale. For example, the first product and the second product may both have a discount associated with them, in which case the same designation is "discount applied". As another example, the first product and the second product may both be a "special edition" product having a designation of time-limited availability for sale and/or limited inventory.

In some embodiments, identifying the second merchant account on the e-commerce platform includes first identifying the second product that has the same characteristic as the first product, and then identifying a merchant account in the e-commerce platform that sells the second product (e.g. via a stored association in memory between each merchant account and their respective products).

At step 2340, a message is transmitted to a merchant device associated with the second merchant account. The message includes information recommending the rule for the second merchant account for the second product. An example of such a message is that displayed in FIG. 17. For example, the rule recommendation may be included as text in a message prepared by a processor of the e-commerce platform, and the message is then sent through a network interface over a network to the merchant device, e.g. via a transport protocol.

In some embodiments, the method of FIG. 23 further includes determining that the second merchant account meets a particular criterion before recommending the rule for the second merchant account for the second product. This may allow for filtering of merchants, e.g. to only recommend the rule to another merchant having similar characteristics as the first merchant associated with the first merchant account. For example, the particular criterion may relate to: size (e.g. second merchant account must have a certain store size or inventory size, which may be comparable to the first merchant account); and/or sales (e.g. second merchant account must have a certain quantity or dollar amount of sales, which may be comparable to the first merchant account); and/or page views (e.g. one or more products associated with the second merchant's account must have a certain number of page views, which may be comparable to the number of page views of one or more products associated with the first merchant account); and/or location of a merchant associated with the second merchant account (e.g. the merchant associated with the second merchant account may need to be located in a particular region or city, which may be the same region or city as the merchant associated with the first merchant account). If the particular criterion is met, then the rule is recommended.

In some embodiments, the method of FIG. 23 may be varied such that the rule controls a user's online access to a particular function instead of (or in addition to) a particular product. For example, the rule may be that a user is not allowed to add any product to an online cart until the user registers with the e-commerce platform (e.g. creates an account).

The e-commerce platform includes components that perform the functions of the e-commerce platform described above in relation to FIG. 23. For example, the e-commerce platform may include a memory (e.g. memory 614) to store the rule that controls the user's online access to the first product, and to store an association between the rule and an outcome related to the first product. As another example, the e-commerce platform may include a processor that performs steps of FIG. 23. The processor may be a general purpose processor that executes instructions stored in memory or specific processing circuitry (e.g. ASIC, GPU, FPGA). The processor may implement the rule executor 610 and rule recommender 612 of FIG. 6, where the rule executor 610 performs the function of implementing the rule that controls a user's online access to a first product, and the rule recommender 612 performs the functions of associating the rule with an outcome related to the first product, identifying a second merchant account on the e-commerce platform where a second product that has a same characteristic as the first product if offered for sale, and instructing transmission of the message recommending the rule to a merchant device associated with the second merchant account.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
receiving a web request;
identifying a user associated with the web request; and
after receiving the web request and prior to providing a resource requested in the web request, processing the web request based on information about the user's previous online commerce activity, wherein processing the web request based on the information about the user's previous online commerce activity comprises comparing the information about the user's previous online commerce activity to a rule and processing the web request based on the rule, including performing one of:
imposing a delay before allowing the web request to proceed to a destination of the web request;
blocking the web request;
routing or rerouting the web request to a particular server; or
denying access to the resource requested in the web request.

2. The computer-implemented method of claim 1, wherein the information about the user's previous online commerce activity includes information specifying at least one of:
a previous purchase made by the user;
purchase timing;
amount of money spent on purchasing one or more products; or
whether the user is registered with an e-commerce platform.

3. The computer-implemented method of claim 1, wherein the resource is a webpage requested in the web request or a particular function to be performed by a server.

4. The computer-implemented method of claim 3, further comprising identifying a merchant associated with the resource, and wherein the rule is associated with the merchant.

5. The computer-implemented method of claim 4, wherein identifying the merchant associated with the resource comprises identifying the merchant based on at least part of a uniform resource locator (URL) in the web request.

6. The computer-implemented method of claim 1, wherein identifying the user associated with the web request comprises extracting a unique ID from the web request or from one or more packets associated with the web request, and identifying the user from the unique ID, wherein the unique ID is at least one of:
a user ID from a cookie in the web request;
an IP address of a user device from which the web request was received; or
a browser ID associated with the user device from which the web request was received.

7. The computer-implemented method of claim 1, wherein the web request is a HyperText Transfer Protocol (HTTP) request.

8. A system comprising:
a network interface to receive a web request; and
at least one processor to:
identify a user associated with the web request; and
after receiving the web request and prior to providing a resource requested in the web request, process the web request based on information about the user's previous online commerce activity, wherein the at least one processor is to process the web request based on the information about the user's previous online commerce activity by comparing the information about the user's previous online commerce activity to a rule and processing the web request based on the rule, including performing one of:
imposing a delay before allowing the web request to proceed to a destination of the web request;
blocking the web request;
routing or rerouting the web request to a particular server; or
denying access to the resource requested in the web request.

9. The system of claim 8, wherein the information about the user's previous online commerce activity includes information specifying at least one of:
a previous purchase made by the user;
purchase timing;
amount of money spent on purchasing one or more products; or whether the user is registered with an e-commerce platform.

10. The system of claim 8, wherein the resource is a webpage requested in the web request or a particular function to be performed by a server.

11. The system of claim 10, wherein the at least one processor is to identify a merchant associated with the resource, and wherein the rule is associated with the merchant.

12. The system of claim 11, wherein identifying the merchant associated with the resource comprises identifying the merchant based on at least part of a uniform resource locator (URL) in the web request.

13. The system of claim 8, wherein the processor is to identify the user associated with the web request by performing operations including extracting a unique ID from the web request or from one or more packets associated with the web request, and identifying the user from the unique ID, wherein the unique ID is at least one of:
a user ID from a cookie in the web request;
an IP address of a user device from which the web request was received; or
a browser ID associated with the user device from which the web request was received.

14. A non-transitory computer-readable medium having stored thereon computer-executable instructions that, when executed, cause a computer to perform operations comprising:
receiving a web request;
identifying a user associated with the web request; and
after receiving the web request and prior to providing a resource requested in the web request, processing the web request based on information about the user's previous online commerce activity, wherein processing the web request based on the information about the user's previous online commerce activity comprises comparing the information about the user's previous online commerce activity to a rule and processing the web request based on the rule, including performing one of:

imposing a delay before allowing the web request to proceed to a destination of the web request;

blocking the web request;

routing or rerouting the web request to a particular server; or denying access to the resource requested in the web request.

15. The non-transitory computer-readable medium of claim 14, wherein the information about the user's previous online commerce activity includes information specifying at least one of:

a previous purchase made by the user;

purchase timing;

amount of money spent on purchasing one or more products; or whether the user is registered with an e-commerce platform.

16. The non-transitory computer-readable medium of claim 14, wherein the resource is a webpage requested in the web request or a particular function to be performed by a server.

17. The non-transitory computer-readable medium of claim 16, wherein the instructions, when executed, further cause the computer to perform operations comprising identifying a merchant associated with the resource, and wherein the rule is associated with the merchant.

18. The non-transitory computer-readable medium of claim 17, wherein identifying the merchant associated with the resource comprises identifying the merchant based on at least part of a uniform resource locator (URL) in the web request.

19. The non-transitory computer-readable medium of claim 14, wherein identifying the user associated with the web request comprises extracting a unique ID from the web request or from one or more packets associated with the web request, and identifying the user from the unique ID, wherein the unique ID is at least one of:

a user ID from a cookie in the web request;

an IP address of a user device from which the web request was received; or a browser ID associated with the user device from which the web request was received.

20. The non-transitory computer-readable medium of claim 14, wherein the web request is a HyperText Transfer Protocol (HTTP) request.

* * * * *